United States Patent [19]

Knapp et al.

[11] 4,449,202

[45] May 15, 1984

[54] FULL DUPLEX INTEGRATED CIRCUIT COMMUNICATION CONTROLLER

[75] Inventors: George W. Knapp, Cambridge; Bernard B. Spaulding, The Plains; John T. Tolbert, Cambridge, all of Ohio

[73] Assignee: NCR Corporation, Dayton, Ohio

[21] Appl. No.: 327,650

[22] Filed: Dec. 4, 1981

[51] Int. Cl.[3] ...................... G06F 13/00; H01L 25/00
[52] U.S. Cl. .................................. 364/900; 364/200; 357/45
[58] Field of Search ............... 364/200, 900; 357/40, 357/45

[56] References Cited

U.S. PATENT DOCUMENTS

| | | | |
|---|---|---|---|
| 3,968,478 | 7/1976 | Mensch, Jr. ...................... | 364/200 |
| 4,124,888 | 11/1978 | Washburn ......................... | 364/200 |
| 4,144,561 | 3/1979 | Tu et al. ............................ | 364/200 |
| 4,223,380 | 9/1980 | Antonaccio et al. .............. | 364/200 |
| 4,393,464 | 7/1983 | Knapp et al. ...................... | 364/200 |
| 4,407,014 | 9/1983 | Holtey et al. ..................... | 364/200 |

OTHER PUBLICATIONS

'Manchester Terminal Unit in CMOS LSI', Military Electronics/Countermeasures, vol. 5, No. 4, Apr. 14, 1979.

*Primary Examiner*—Jerry Smith
*Assistant Examiner*—William G. Niessen

*Attorney, Agent, or Firm*—J. T. Cavender; Wilbert Hawk, Jr.; Richard W. Lavin

[57] ABSTRACT

An integrated circuit chip for controlling the transmission of data between a host peripheral device and other peripheral devices or a remote processor in which the transmission of data takes place in either a processor interrupt mode or a direct memory access mode. The integrated circuit chip includes first, second, third and fourth sequentially located edges forming a rectangle. The chip further includes input circuitry located generally adjacent the corner formed by the third and fourth edges and output circuitry located adjacent the first edge. A plurality of counters/registers associated with the input and output circuits are located adjacent the third edge. A Command register located adjacent the third edge selects the transfer mode and controls the operation of the integrated circuit chip in either an output or input mode. The chip may operate in a transmit only mode, receive only mode or transmit and receive modes simultaneously. The output circuitry generates a bit stream which includes opening and closing flags, Manchester encoded data bits and a frame check signal (FCS) check data bit. The input circuitry monitors the incoming data bit stream for the address of the associated peripheral device. The input circuitry further decodes the incoming data bit stream and checks the FCS data bit received. A data bit stored in the Command register generates a diagnostic routine in which the output data bit stream is transferred to the input circuitry.

11 Claims, 20 Drawing Figures

FULL DUPLEX INTEGRATED CIRCUIT COMMUNICATION CONTROLLER

BACKGROUND OF THE INVENTION

The present invention relates to integrated circuits for economically communicating between a plurality of peripheral devices and/or with a processor.

Use of MOS (metal-oxide-semiconductor) large-scale-integration (LSI) circuits in electrical devices has contributed to the cost reduction of such devices. In designing semiconductor chips, the large number of MOSTs (metal-oxide-semiconductor-transistors) together with the interconnection patterns of conductor lines therebetween must be optimized to provide the highest component density in order to reduce the required chip area to a minimum. Minimum line widths and spacing between the respective conductors composed of either polycrystalline silicon or aluminum and the MOSTs must be maintained to avoid short circuits and parasitic effects. Yet, the length of the interconnecting lines and their associated capacitances must be minimized not only to reduce chip size, but also to achieve maximum circuit operating speeds. A wide variety of trade-offs, including the necessity to minimize chip size, to increase circuit operating speed, to reduce power consumption, and to achieve acceptable reliability are involved in obtaining an optimum "layout" or arrangement of MOSTs and conductor interconnection patterns therebetween in order to obtain a MOS LSI circuit which is both economical and has acceptable operating characteristics. Often, the technical and commercial success of an electronic product utilizing MOS LSI technology hinges on the ability of the chip designer to achieve an optimum chip topography.

Some of the numerous design constraints faced by the MOS LSI chip designer include specifications for the minimum width and a spacing of diffused regions in the silicon, the minimum size required for contact openings in the insulating field oxide, the spacings required between the edges of contact openings to the edge of diffused regions, the minimum width and spacing of polycrystalline silicon conductors, the fact that such polycrystalline silicon conductors cannot coincide with the diffused regions, the minimum widths and spacings between the aluminum conductors, and the constraint that conductors on the same layer of insulated oxide cannot cross over like conductors. The high amount of capacitance associated with diffused regions and the resistances of both diffused regions and the polycrystalline silicon conductors must be carefully considered by the circuit designer and the chip designer in arriving at an optimum chip topography. Accordingly, it is an object of the present invention to provide an integrated circuit communication controller chip for effecting the transfer of data signals between remote peripheral devices and/or with a central processor in which the integrated circuit chip has a topography which provides the maximum possible circuit operating speed with the lowest possible chip size and power dissipation. It is a further object of this invention to provide an integrated chip which provides a full duplex bit synchronous communication protocol which transmits and receives Manchester encoded data utilizing either direct memory access or system access of appropriate registers over a multiplexed addressed-data bus. It is still a further object of the present invention to provide an integrated circuit communication controller chip which is very low in cost, thereby enabling its use in each of the plurality of remote peripheral devices.

SUMMARY OF THE INVENTION

Briefly described, the present invention provides an MOS LSI communication controller integrated circuit chip having optimum chip topography which, when associated with a processor operated terminal device, relieves the processor of communication protocol routines. The chip topography includes two full duplex communication channels, internal data, address, timing and control busses. The integrated circuit chip includes top (upper), right, bottom (lower) and left sequentially located edges for forming a rectangle. Transmit and direct memory access control circuits are located along the top edge of the chip while the receive control circuits are located adjacent the corner formed by the left and bottom edges of the chip. Input/output data/address data pins are located along the bottom edge of the chip. An address decoder located in the lower left hand corner of the chip allows inputted data access to all internal registers and counters. The read/write counter/register associated with the transmit and receive circuitry are located along the bottom edge of the chip. A storage register located adjacent the corner formed by the left and bottom edges of the integrated circuit chip controls the operation of the transmit and receive circuitry and includes a data bit for transferring the transmitted data bit stream to the input circuitry of the chip for a diagnostic routine. An identification register located adjacent the lower edge of the chip notifies the terminal processor of the presence of the chip in the communications system.

BRIEF DESCRIPTION OF THE DRAWINGS

FIG. 1, is a diagram showing how FIGS. 2A-2D inclusive are arranged;

FIG. 1, is a diagram illustrating the package and lead configuration of the package in which the integrated circuit of the present invention is ultimately housed.

DESCRIPTION OF THE PREFERRED EMBODIMENT

Figure 1:
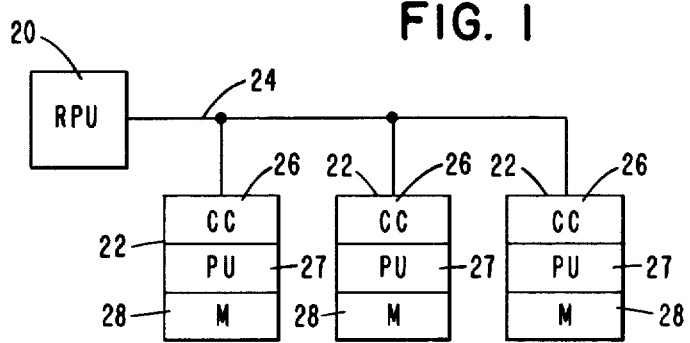
FIG. 1 shows a block diagram of a data processing system in which the communication chip of the present invention is associated with each of a plurality of remote terminal devices connected to a remote processing unit over a two wire communications bus.
Figure 3:
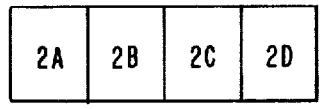
FIG. 3, on the sheet containing

Referring now to FIG. 1, there is shown a block diagram of a conventional data processing system which includes a master processing unit (RPU) 20 which is connected to a plurality of terminal devices 22 over a two wire communication bus 24. All terminals devices 22 have their receiver portion connected to a common line which is driven by the transmitter portion of the RPU 20. The transmitter portion of all the terminal devices 22 are connected to a common transmission line which drives the receiver portion of the RPU 20. Each of the terminal devices 22 includes a communication controller chip 26 present on the communication bus 24, a terminal processor unit (PU) 27 and a memory unit (M) 28. The memory unit 28 is shared by the controller chip 26 and the processor unit 27. An example of a terminal processor is the Intel 8085 commercially available from the Intel Corporation of Santa Clara, Calif. The communication chip 26 performs all communication routines for controlling the transfer of data between its associated terminal processor unit 27 and the master processing unit 20. The terminal processor units 27 may communicate with each other only through the RPU 20.

Referring now to FIGS. 2A–2D inclusive, there is shown a block diagram illustrating the general location of the major sections of the circuit on the surface of the integrated circuit chip which comprises the communication controller chip 26 (FIG. 1). The chip includes upper or top 30, right side 32, lower or bottom 34 and left side 36 edges. The edge assignments are used in explaining the topography of the chip with the realization that a chip may have an orientation other than that shown in the drawing. Located along the edges of the controller chip 26 are a plurality of bonding pads through which the input and output signals associated with the transfer of data between the processor unit 27 and the controller chip 26 takes place. Located along the top edge 30 (FIGS. 2A–2C inclusive) are the bonding pads associated with the transfer of data on the bus 24. Included in the bonding pads are the Bus Clock bonding pad 40 (BCLK) (FIG. 2A) whose received signal represents the bus clock; the Bus Power Down Request bonding pad 42 (BPDRQ) whose signal when active low indicates the loss of the primary power; the Bus Acknowledge In bonding pad 44 ($\overline{\text{BAKIN}}$) which when active low indicates that a terminal device higher in the physical priority chain has not requested control of the bus; Bus Acknowledge bonding pad 46 ($\overline{\text{BAK}}$) which when active low indicates that a request for bus control has been acknowledged; Bus Acknowledge Out bonding pad 48 (FIG. 2B) (BAKOUT) which when active high indicates that the $\overline{\text{BAKIN}}$ input is active low and that the terminal device did not request bus control; Driver bonding pad 50 ($\overline{\text{DRVR}}$) which when active low indicates that the terminal device has taken control of the bus; the chip 5 volt power supply bonding pad 52 ($V_{DD}$); the Bus Request bonding pad 54 ($\overline{\text{BRQ}}$) which when active low indicates that a request for bus control has been generated by the terminal device in order to perform a DMA write or DMA read cycle; the Interrupt bonding pad 56 (FIG. 2C) ($\overline{\text{INT}}$) which when active low provides an interrupt signal to the controlling terminal processor 27; the Bus Ready bonding pad 58 ($\overline{\text{BRDY}}$) which when active low indicates that the bus is available for a data transfer operation; and the Memory Request bonding pad 60 ($\overline{\text{MRQ}}$) which is active low only during a DMA read/write operation to the terminal memory 28 which is shared with the terminal processor 27.

Located along the left edge (FIG. 2A) of the chip 26 is the Buss Communication Rate Clock bonding pad 62 (BCOMCLK) whose signal is a system 2.304 MHz. clock used as a timing reference for the transfer rate of the data messages on the communication bus 24; the Input/Output Write strobe bonding pad 64 ($\overline{\text{IOW}}$) which when active low allows the terminal processor 27 to transfer data to the controller chip; the Chip Select bonding pad 66 ($\overline{\text{CS}}$) which is provided for use during a programmed input/output (PIO) terminal memory access operation; the Input/Output Read strobe bonding pad 68 ($\overline{\text{IOR}}$) which when active low allows the terminal processor unit 27 to have access to data held in the controller chip; and the Address Latch Enable bonding pad 70 (ALE) which when active high allows the controller chip to store a portion of the address bits of the incoming data message.

Figure 2A:
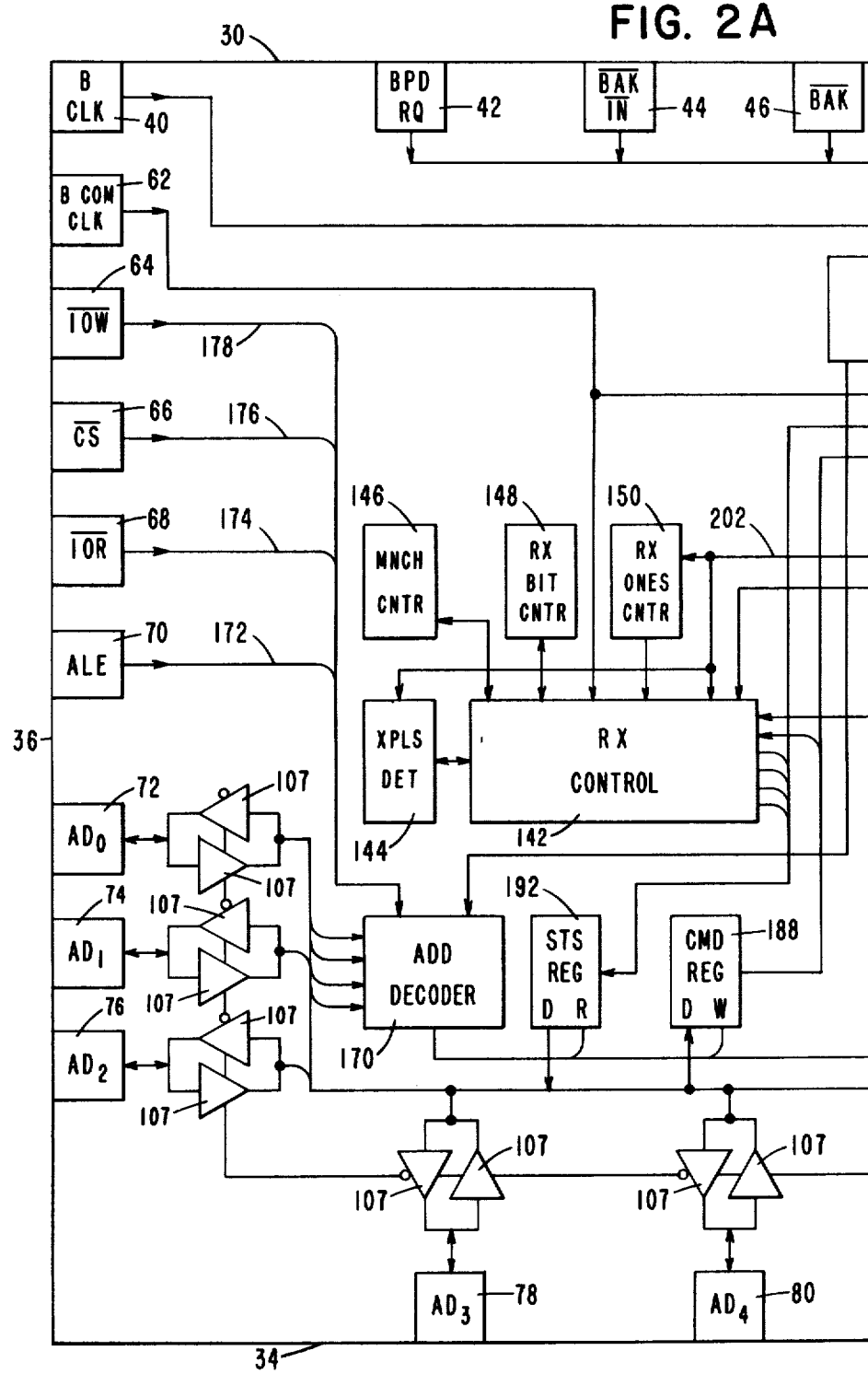
FIGS. 2A-2D inclusive taken together constitute a block diagram illustrating the general location of the major sections of circuitry on the surface of the integrated circuit chip of the present invention.
Figure 2B:
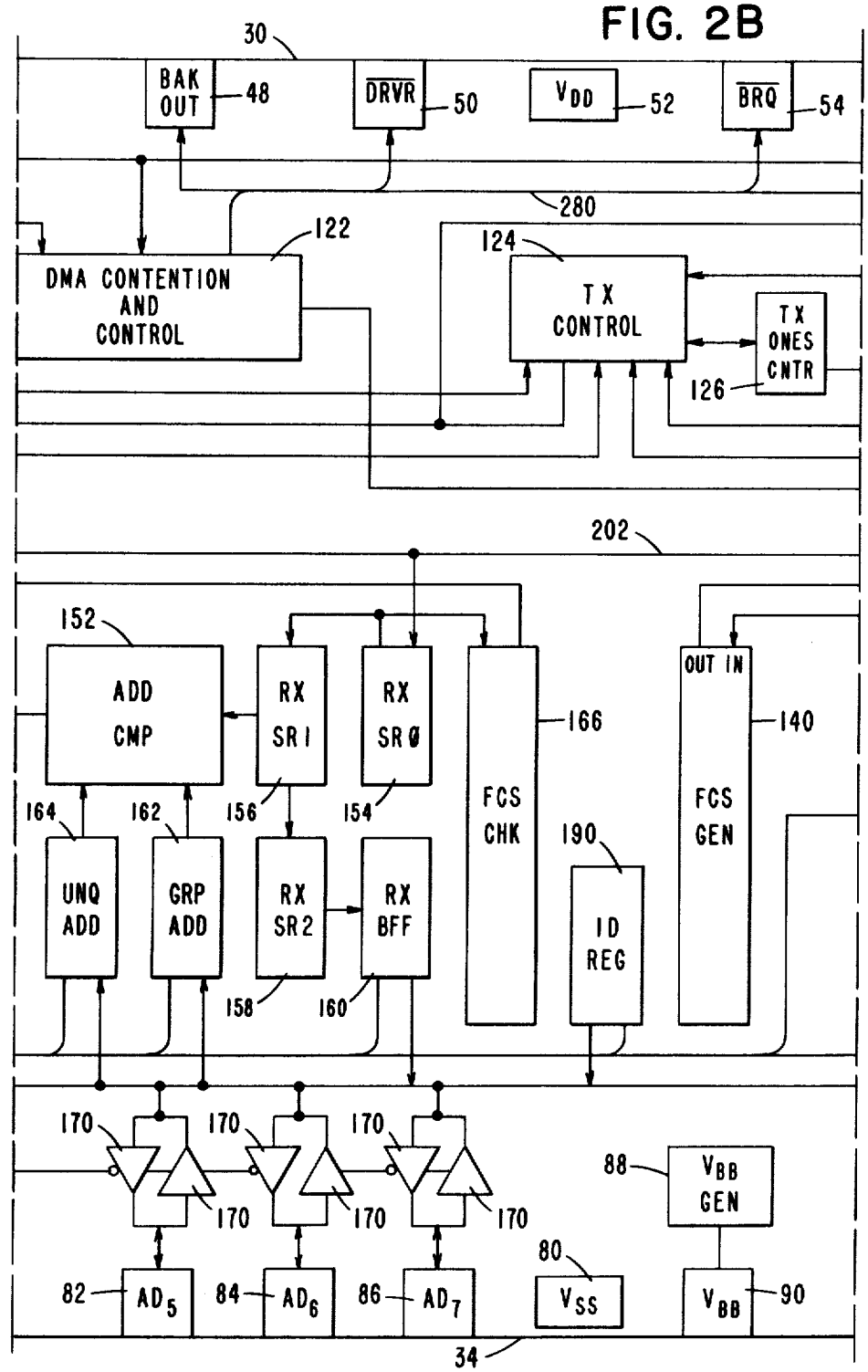
Figure 2C:
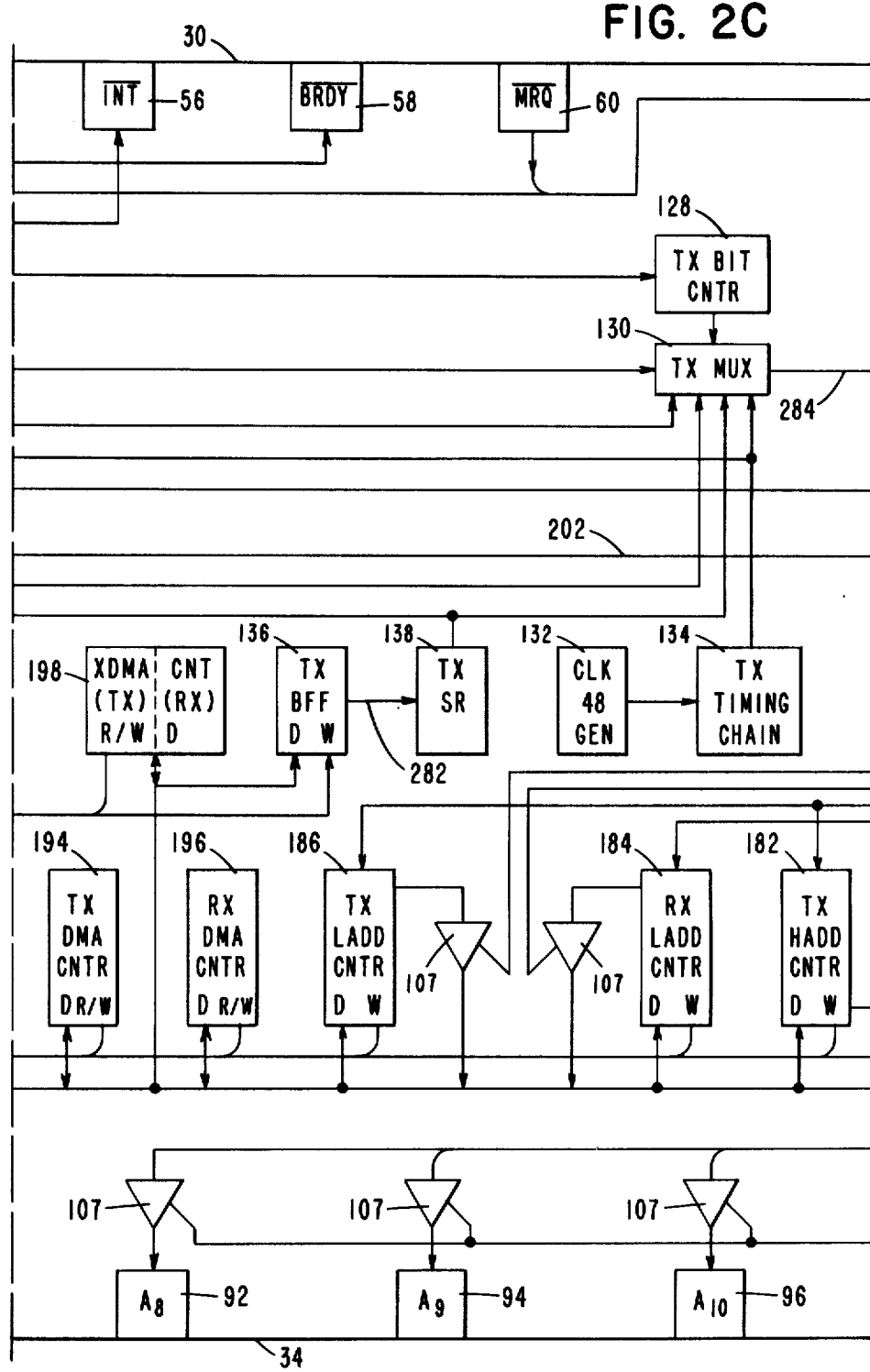
Figure 2D:
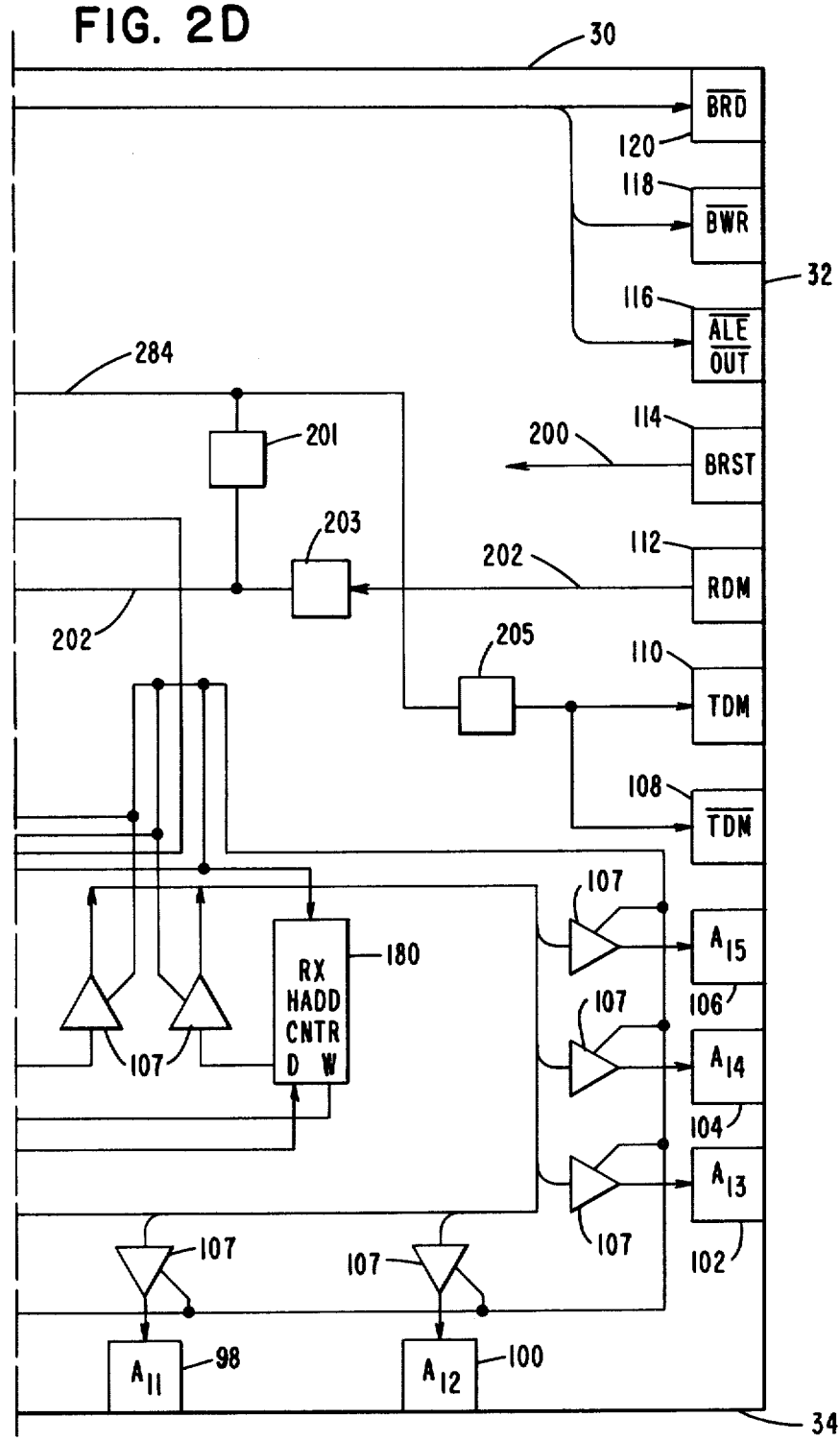

Located along the lower portion of the left edge 36 of the controller chip 26 together with the bottom edge 34 and the lower portion of the right edge 32 are the bonding pads 72–106 inclusive that are associated with the address/data bits of the data message. The lower eight bits of the address appear on the active high bi-directional/three state bonding pads 72–86 inclusive during the first clock cycle of a DMA (Direct Memory Access) operation (FIGS. 2A and 2B). The upper eight bits representing the address portion will appear on the bonding pads 92–106 (FIGS. 2C and 2D). These latter eight output signals provide upper eight bit address information only during DMA cycles initiated by the controller chip. The bonding pads shown in FIGS. 2A–2D inclusive are connected through signal drivers 107 to the circuits in the chip 26.

Located along the right edge 32 of the controller chip 26 (FIG. 2D) is the inverted Transmit Data Manchester bonding pad 108 ($\overline{\text{TDM}}$) whose signal represents the inversion of the Manchester encoded serial data bit pattern generated by the controller chip when in the transmit mode; the Transmit Data Manchester bonding pad 110 (TDM) connected to the output transmission lines of the bus 24 over which will appear the Manchester encoded data serial bit pattern generated by the controller chip when in the transmit mode (FIGS. 6A and 6B); the Receive Data Manchester bonding pad 112 (RDM) connected to the input transmission lines of the bus 24 over which will appear the received Manchester encoded serial data bit pattern (FIGS. 7A and 7B) and the Bus Reset bonding pad 114 (BRST) which signal provides for the power up initialization of the controller chip in a manner that is well-known in the art. As will be described more fully hereinafter, the location of each of the bonding pads on the edges of the controller chip 26 has been selected so that the signal associated with the bonding pad will have the shortest distance to travel to the integrated circuit components of the chip which processes the signals. This allows very short interconnection conductors to be utilized thereby reducing their associated capacitances and resistances.

Further located on the right edge 32 of the controller chip 26 is the Address Latch Enable bonding pad 116 ($\overline{\text{ALEOUT}}$) whose signal is active only during a DMA read/write operation; the Bus Write strobe bonding pad 118 ($\overline{\text{BWR}}$) whose signal is active only during a controller chip initiated write DMA operation and the Bus Read strobe bonding pad 120 ($\overline{\text{BRD}}$) whose signal is active only during a control chip initiated read DMA operation.

Located also along the bottom edge 34 of the controller chip 26 is the ground bonding pad 80 ($V_{SS}$) and a back bias generator 88 ($V_{BB}$) connected to the bonding pad 90 (FIG. 2B) for supplying power to the various circuits on the controller chip.

Referring now to FIGS. 2A and 2B, there is shown located along the top edge 30 of the controller chip 26 a Direct Memory Access (DMA) Contention and Control circuit 122 which resolves contention among multiple DMA devices located in each of the terminal devices 22 sharing the common communication bus 24. Once access to the PU buss has been given to one of the internal DMA devices of the terminal 22, bus access cannot be terminated by a higher priority request until the cycle is completed. Also located adjacent the top edge 30 of the chip are the circuits associated with the transmission of data which include a Transmit Control (TXCONTROL) circuit 124 (FIG. 2B), a Transmit Ones Counter (TXONESCNTR) 126, a Transmit Bit Counter (TXBITCNTR) 128 (FIG. 2C), a Transmit Multiplexer (TXMUX) 130, a 48 KHz. Clock Generator (CLK48GEN) 132, a Transmit Timing Chain (TXTIMINGCHAIN) circuit 134, a Transmit Buffer (TXBFF) 136, a Transmit Shift Register (TXSR) 138, and a Frame Check Sequence Generator (FCSGEN) 140 (FIG. 2B). The 48 KHz. Clock Generator 132 is a divide-by-48 counter providing a communication internal reference clock of 48 KHz. for use in transmitting the data bit stream over the TDM pad 110 and the $\overline{\text{TDM}}$ pad 108 (FIG. 2D). The Clock Generator 132 is the only separate clock circuit on the chip as each individual circuit has incorporated within the circuit its own clock generator.

The Transmit Timing Chain circuit 134 provides the steering of data that is to be transmitted from the FCS Generator 140, the Transmit Shift Register 138 and the clock output of the Clock Generator 132 to the Transmit Multiplexer 130. The Multiplexer 130 combines all the data bits to a common output line 284 (FIGS. 2C and 2D) which data bits are Manchester encoded in the Transmit Multiplexer 130 and transmitted over the bonding pads 108 ($\overline{\text{TDM}}$) and 110 (TDM) (FIG. 2D). The Transmit Bit Counter 128 (FIG. 2C) counts the number of bits outputted from the Transmit Shift Register 138 to provide word synchronization indicating when a data character is required in the transmit buffer for continuous transmission. The Transmit Ones Counter 126 (FIG. 2B) indicates the number of contiguous ones that is being transmitted.

Figure 6A:
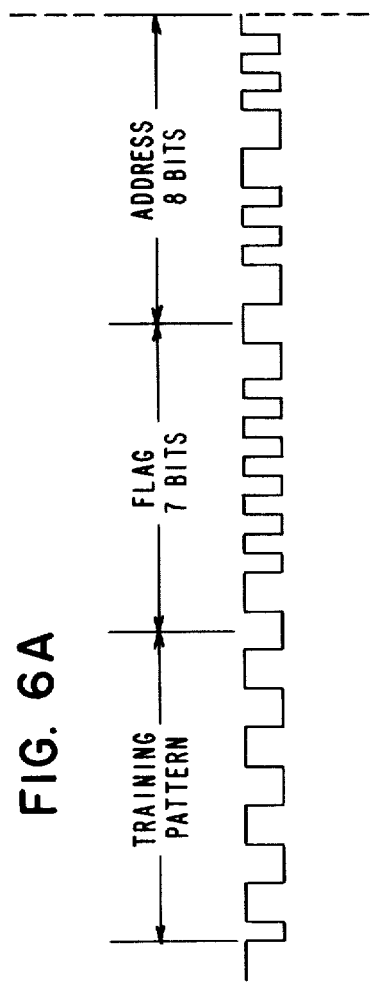
FIGS. 6A and 6B taken together show the waveforms of a transmitted frame of data.
Figure 6B:
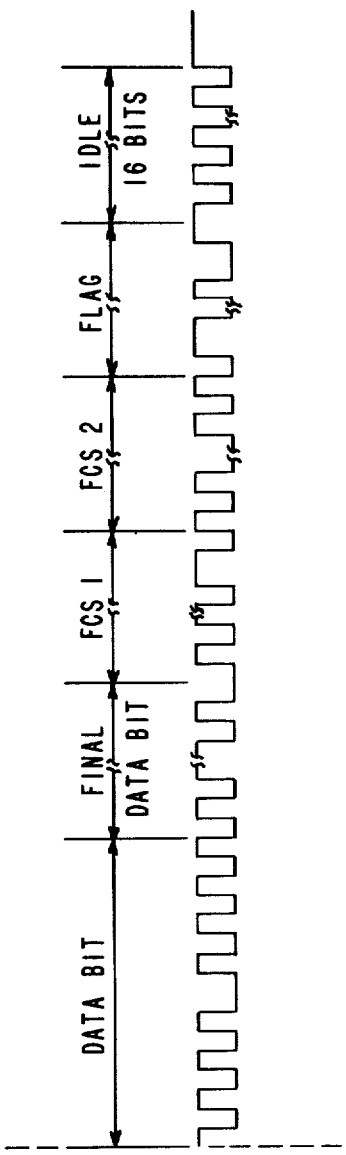
Figure 7A:
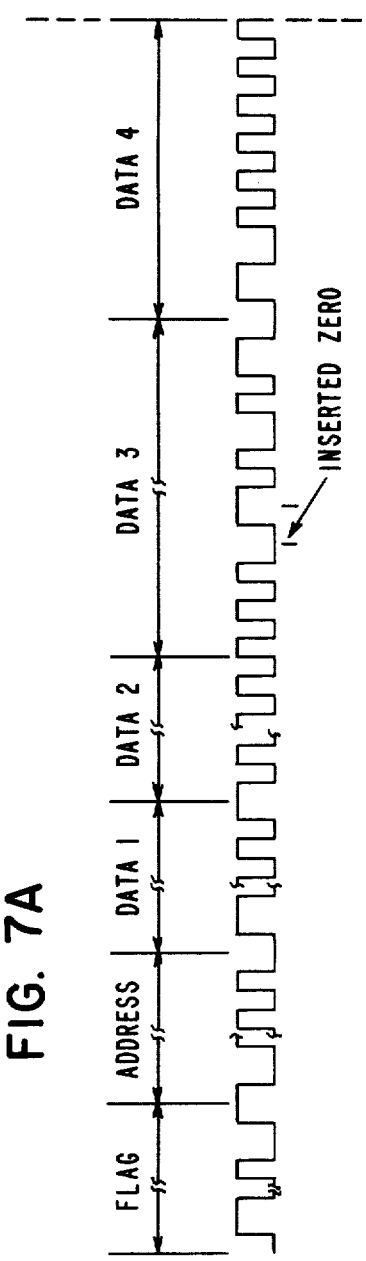
FIGS. 7A and 7B taken together show the waveforms of a received frame of data.
Figure 7B:
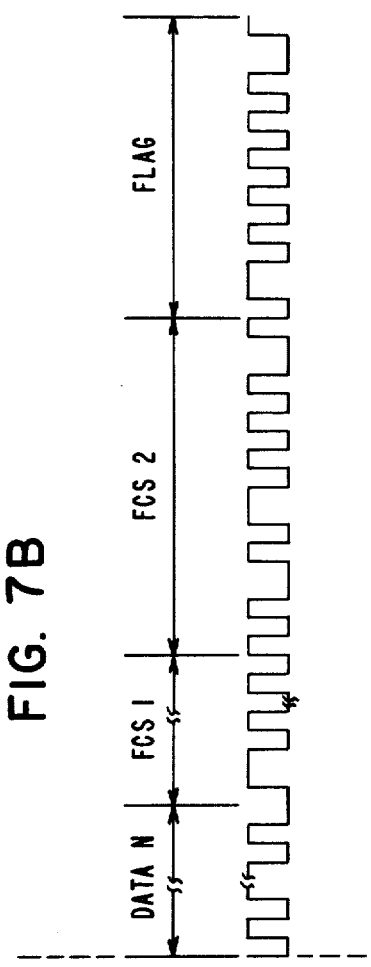
Figure 8:
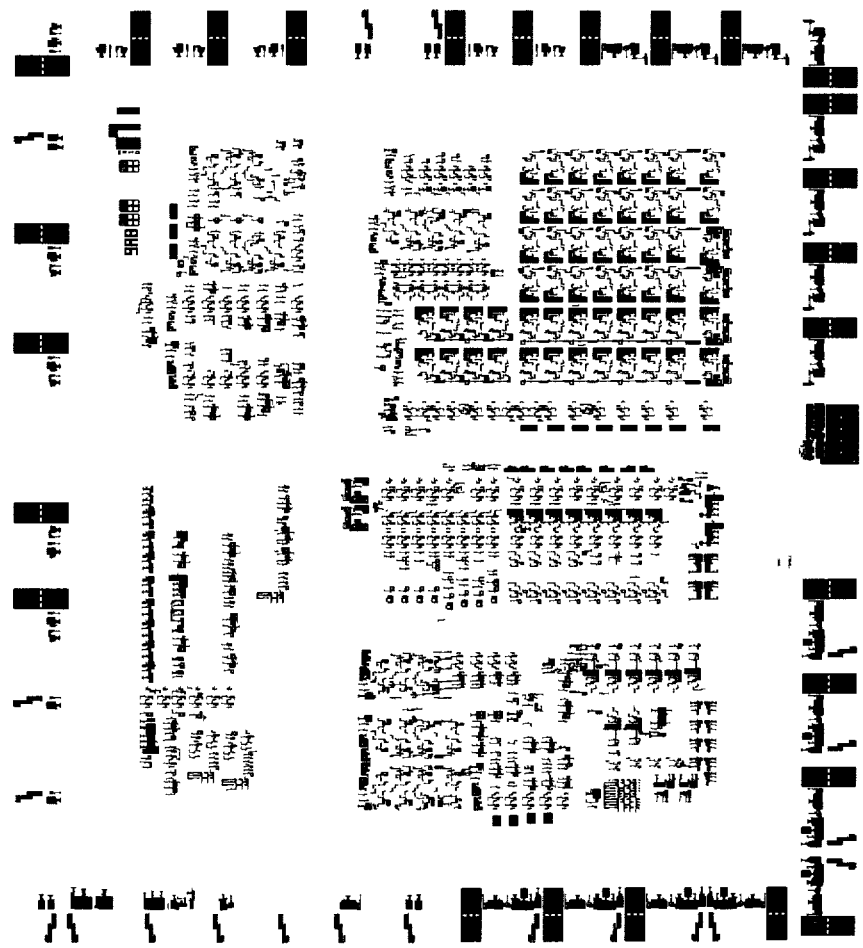
FIG. 8 is a scale reproduction of a photo mask utilized to define the pattern of the source-drain diffused regions in the integrated circuit chip of the present invention.
Figure 9:
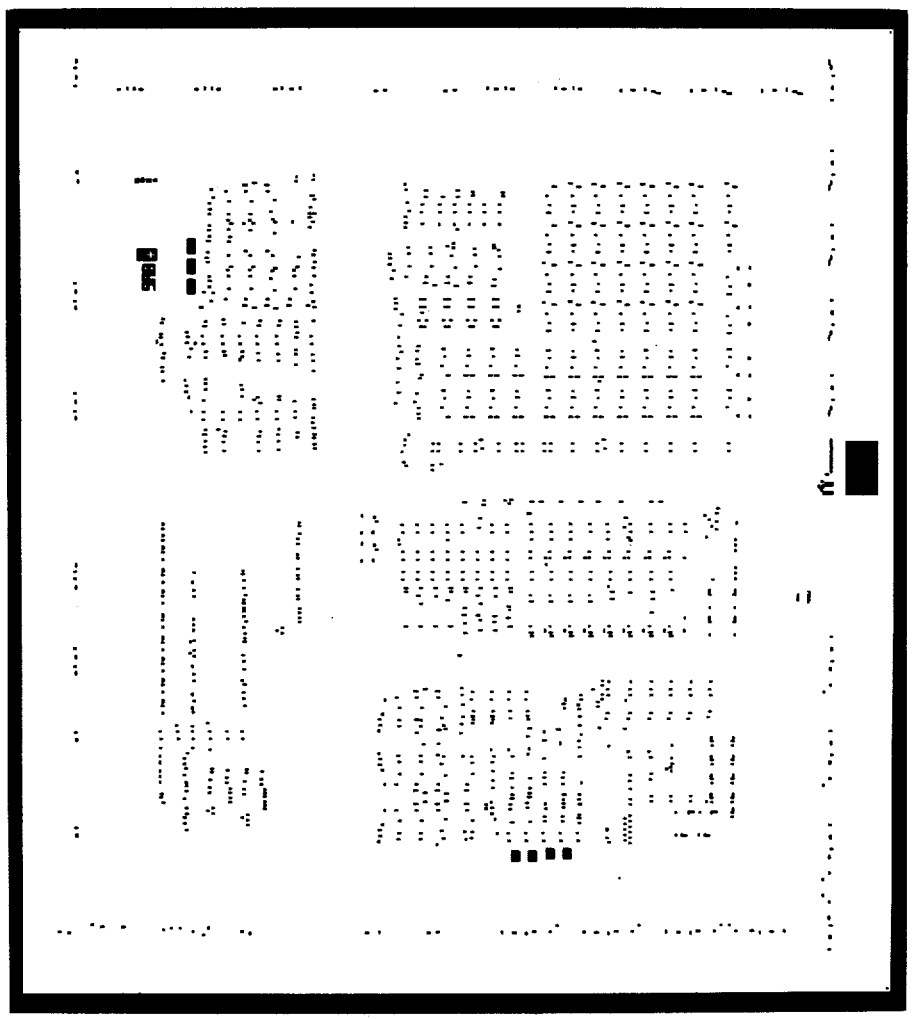
FIG. 9 is a scale reproduction of a photo mask utilized to define the pattern of the ion implanted depletion regions of the integrated circuit chip of the present invention.
Figure 10:
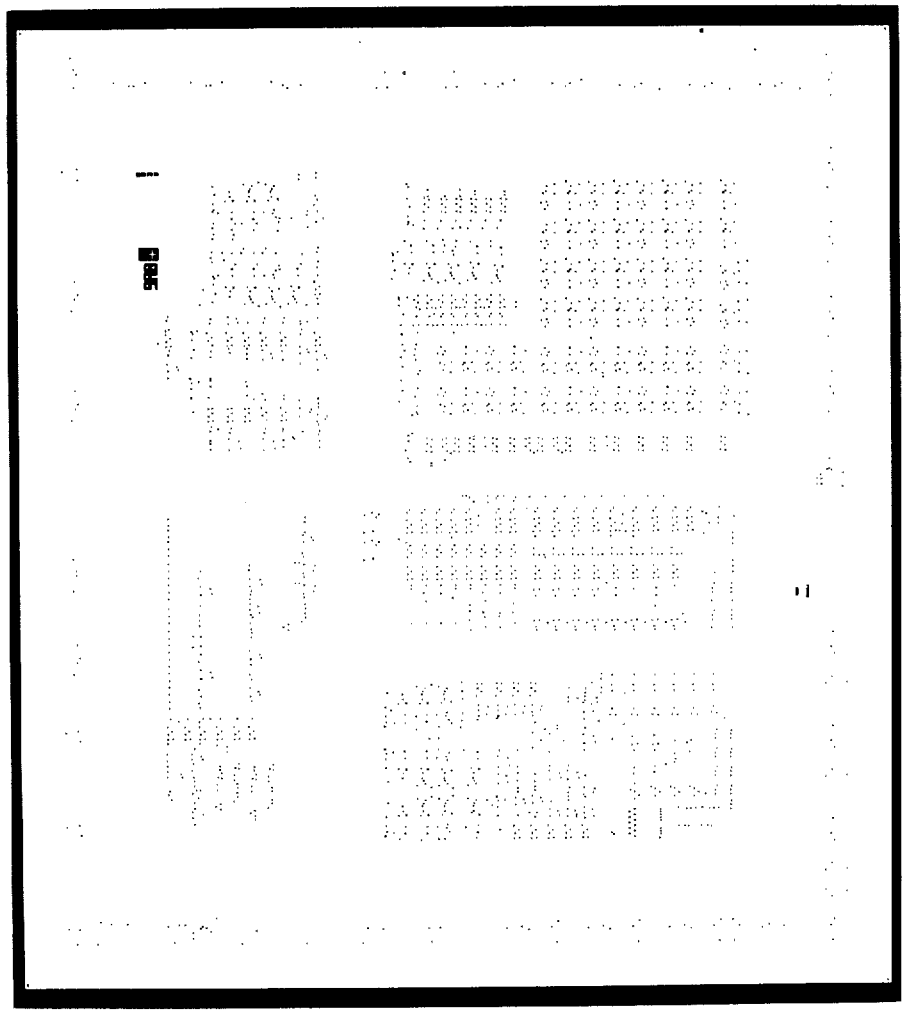
FIG. 10 is a scale reproduction of a photo mask utilized to define the pattern of contacts between the polycrystalline silicon conductors and the diffused regions of the integrated circuit chip of the present invention.
Figure 11:
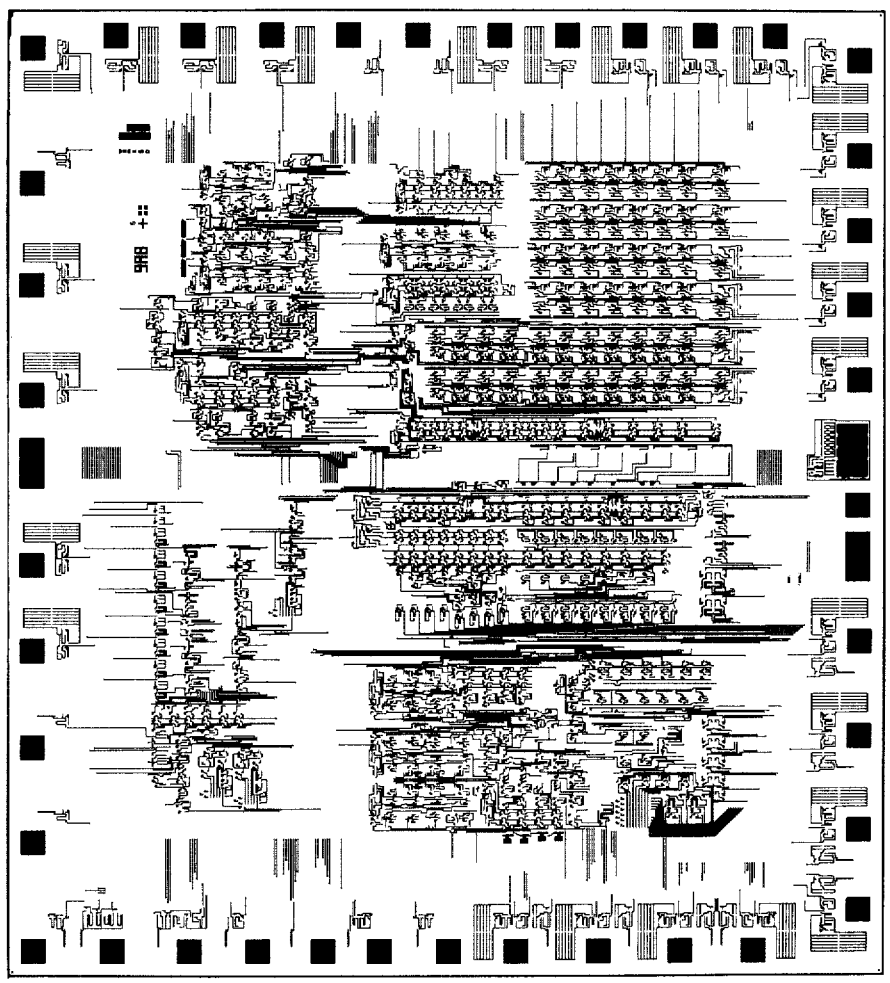
FIG. 11 is a scale reproduction of a photo mask utilized to define the pattern of the polycrystalline silicon layer of conductors of the integrated circuit chip of the present invention.
Figure 12:
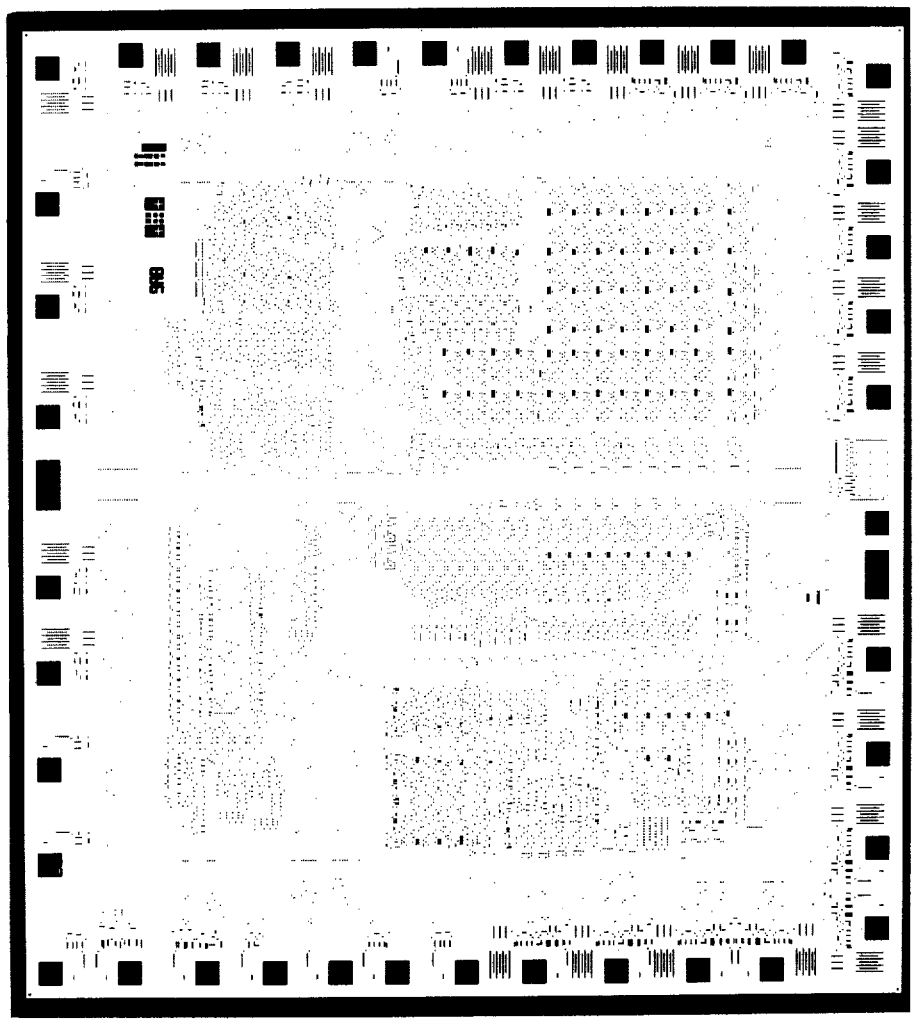
FIG. 12 is a scale reproduction of a photo mask utilized to define all metal conductor interconnection contacts in the integrated circuit chip of the present invention.
Figure 13:
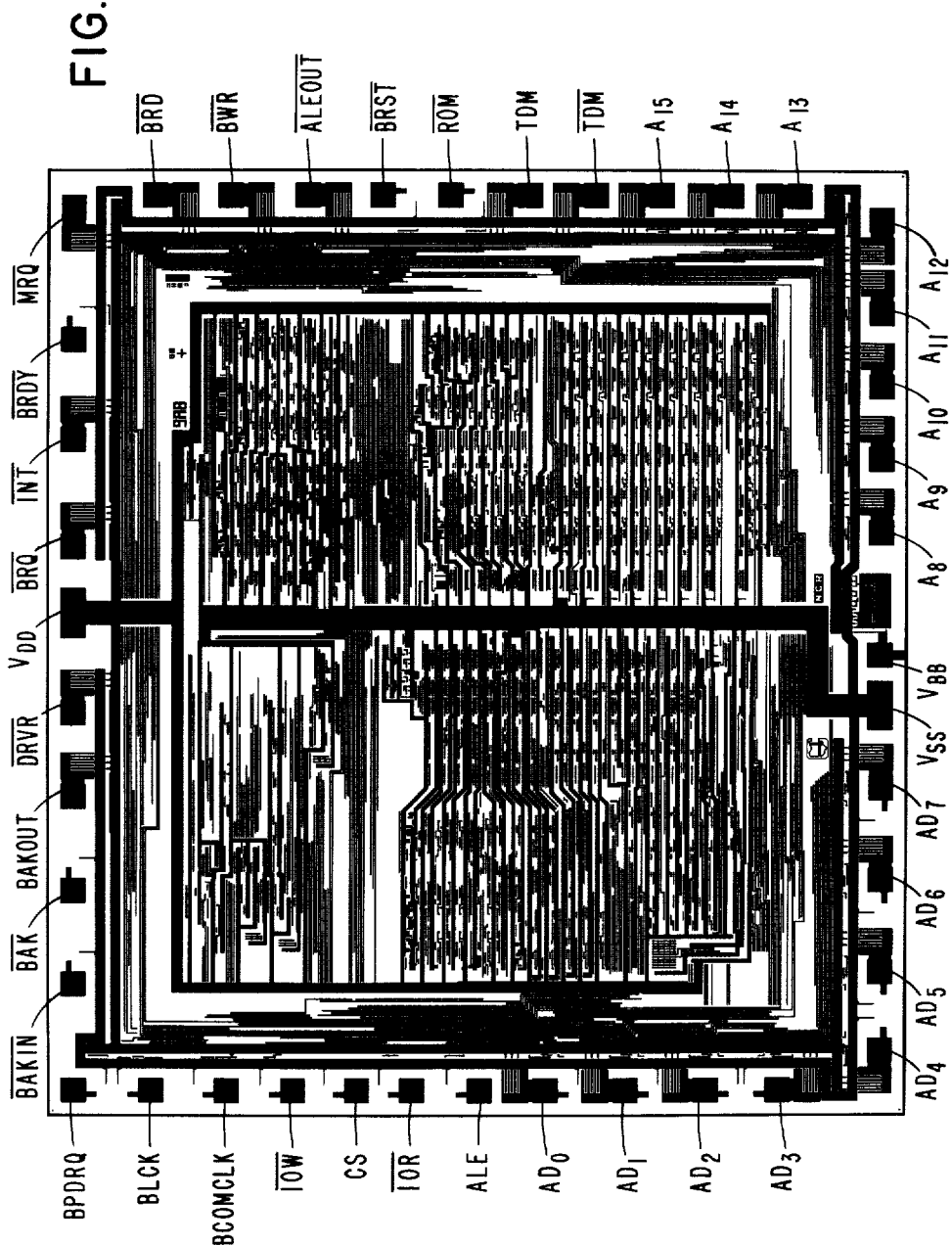
FIG. 13 is a scale reproduction of a photo mask utilized to define the pattern for the metal conductor interconnection layer of the integrated circuit chip of the present invention showing locations of the mounting pads together with the signals associated with the circuit.
Figure 14:
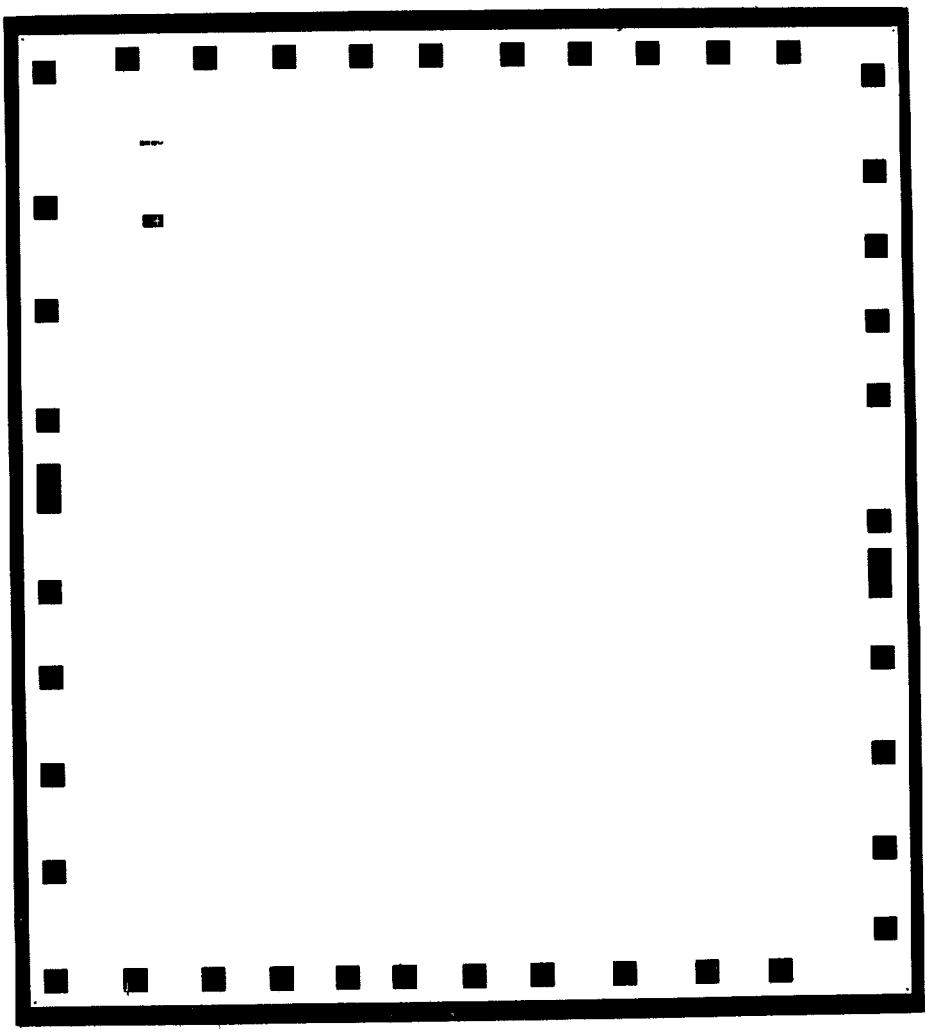
FIG. 14 is a scale reproduction of a photo mask utilized to define the pattern for the passivation layer of the integrated circuit chip of the present invention.

The communication protocol assigned to the controller chip 26 requires that each frame of data is to begin and end with a sequence of six contiguous ones which is termed a flag (FIGS. 6 or 7). In order to maintain the identity of the flag sequence within the transmission, a zero is inserted (FIG. 7A) in the data pattern whenever five contiguous ones occur. The Transmit Ones Counter 126 recognizes when a zero insertion is required and flags the Transmit Control circuit 124 (FIG. 2B) upon reaching a count of five. The Transmit Control Circuit 124 insures that a zero is inserted into the data pattern in response to receiving the output signal from the Counter 126 during transmission of the data. The Transmit Control circuit 124 further synchronizes data transferred from the Transmit Buffer 136 (FIG. 2C) to the Transmit Shift Register 138, synchronizes data field exchanges among the FCS Generator 140 (FIG. 2B), the Transmit Shift Register 138 and the Clock Generator 132 (FIG. 2C), controls clocking of all transmitter functions and monitors the status of the transmission. The FCS Generator 140 implements the CRCCCCITT polynomial ($X^{16}+X^{12}+X^5+1$) on the data that is transmitted from the Transmit Shift Register 138. Upon the conclusion of the transfer of data, the output signals FCS (FIGS. 6B and 7B) of the FCS Generator 140 are added to the frame of data providing a check character for the transmission.

Referring now to FIGS. 2A-2D inclusive, there is shown located toward the bottom edge 34 of the controller chip 26 the receiver circuits which include the Receive Control (RXCONTROL) circuit 142 (FIG. 2A), the Transition Pulse Detect (XPLSDET) circuit 144, the Manchester Counter (MNCHCNTR) 146, the Receive Bit Counter (RXBITCNTR) 148, the Receive Ones Counter (RXONESCNTR) circuit 150, the Address Comparison (ADDCMP) circuit 152 (FIG. 2B), the Receive Shift Register 0 (RXSR0) circuit 154, the Receive Shift Register 1 (RXSR1) circuit 156, the Receive Shift Register 2 (RXSR2) circuit 158, the Receiver Buffer (RXBFF) circuit 160, the Group Address Register (GRPADD) circuit 162, the Unique Address Register (UNQADD) circuit 164, and the Frame Check Sequence Checker (FCSCHK) circuit 166. The receive portion of the controller chip 26 must first decode the Manchester encoded data present on the RDM bonding pad 112 (FIG. 2D). The RDM bonding pad carries a bit stream consisting of combined clock and data information. Under the supervision of the Receive Control Circuit 142, the Transition Pulse Detect circuit 144 and the Manchester Counter 146 perform clock and data separation in decoding the Manchester encoded data bits and provide bit synchronization to the receiver in a manner to be described more fully hereinafter. The Receive Bit Counter 148 and the Receive Ones Counter 150 provide byte synchronization and deletion of the zero inserted into the bit stream, respectively. Whenever five contiguous ones occur, the Counter 150 is reset and the Receive Bit Counter 148 flags the Receive Control circuit 142 which insures deletion of the inserted zeros.

The Receive Bit Counter 148 indicates the loading of the Receive Buffer 160 and flags the Receive Control circuit 142 when the Receive Buffer is full with a data byte. The Receive Control circuit 142 provides synchronization of all receive functions. The Receive Control circuit 142 monitors the first byte following the opening flag in the data bit stream in order to compare the address found in the byte with the system selected internal address. The Receive Control circuit 142 may be in any one of three address recognition modes: to accept the group address or the unique address; accept only the unique address; or accept any address. The Address Comparator 152 (FIG. 2B) performs the comparison between the incoming address and the designated data field of the Unique Address Register 164, the Group Address Register 162 or against a global address which may be provided. When the appropriate address recognition is made, the Receive Control circuit 142 will accept the incoming data stream. The data is serially shifted through the Shift Registers 154, 156 and 158 (FIG. 2B). The Shift Register 158 is parallel loaded into the Receive Buffer 160 as indicated by the Receive Bit Counter 148 (FIG. 2A). The FCS Checker 166 generates an FCS character on the incoming data stream and compares the generated FCS character with the FCS character embodied in the frame transmission. If the FCS characters match, the Receive Control circuit 142 is notified of the good frame reception by the circuit 166 and the reception ends with the occurrence of the closing flag.

Referring now to FIG. 2A, there is shown located in the lower left hand corner of the chip 26 an Address Decoder 170 which decodes the input signals ALE appearing on line 172, $\overline{IOR}$ appearing on line 174, $\overline{CS}$ appearing on line 176 and $\overline{IOW}$ appearing on line 178 in addition to the address bits $AD_0$, $AD_1$, $AD_2$ and $AD_3$. The decoded inputs produce an internal address map of eight read addresses and eight write addresses. The read addresses are associated with the following registers: a Receive High Order Address (RXHADD) counter/register 180 (FIG. 2D), a Transmit High Order Address (TXHADD) counter/register 182 (FIG. 2C), a Receive Low Order Address (RXLADD) counter/register 184, a Transmit Low Order Address (TXLADD) counter/register 186, a Command (CMD) register 188 (FIG. 2A), a Group Address (GRPADD) register 162 (FIG. 2B), a Unique Address (UUQADD) register 164 and the Transmit Buffer (TXBFF) 136 (FIG. 2C). The output signals of the Address Decoder 170 are also inputted into three read-only registers: an Identification (ID) register 190 (FIG. 2B), a Receive Buffer (RXBFF) register 160 and the Status register 192 (FIG. 2A). The output of the Address Decoder 170 is also inputted into three write/read registers: the Transmit Direct Memory Access (TXDMA) counter/register 194 (FIG. 2C), the Receive Direct Memory Access (RXDMA) counter/register 196 and an Extended Direct Memory Access (XDMA) counter/ register 198 (FIG. 2C). The placement of the counter/registers 180–194 inclusive are packed along the bottom edge 34 to reduce the required length of the edge 34.

The TXBFF register 136 is an 8 bit write-only register which holds data transferred from the terminal memory to the controller chip 26 while the RXBFF register 160 is a read-only register which holds data to be transferred to the terminal memory 28. The TXHADD register 182 and the TXLADD register 186 are 8 bit write-only registers in which are stored the appropriate address bytes representing the location in the terminal memory from where the first data byte is to be transmitted. The TXHADD register 180 (FIG. 2D) and the TXLADD registers 184 (FIG. 2C) are 8 bit write-only registers in which are stored the appropriate address bytes representing the location in the terminal memory where the first data byte received is to be written. After each DMA read and write cycles, the concatenated address value in the registers 182, 186, 180 and 184 are incremented by one.

The unique and group address registers 164 and 162 are write only registers in which the appropriate address is stored for comparison to the address in the incoming data frame. The placement of the address registers 162 and 164 in the integrated circuit was governed by the circuit for which the address data bits would be sent. In this situation, the Address Comparator 152 (FIG. 2B), allows for short interconnection lines and therefore reduced capacitance. If a match occurs, the data frame is accepted as valid. The RXDMACNT register 196 and the TXDMACNT register 194 count the number of bytes transferred with respect to the buffers 136 and 160. If N bytes are to be transferred, then the registers are preset with a count of $N-1$. If a frame of data containing more than N data bytes is received, then a Receiver-Not-Serviced condition will occur. The XDMACNT register 198 is a read/write register in which the lower 4 binary bits extend the capacity of the RXDMACNT register 196 while the upper 4 bits extend the capacity of the TXDMACNT register 196 to accommodate a block of data having a maximum size of 4096 bytes.

The Command register 188 and the Status register 192 (FIG. 2A) are used to control and monitor the operation of the controller chip 26. The data stored in the Command register 188 is used to initiate or suspend communication operation and to define the mode of the processor/terminal data transfer operation. The controller chip 26 may be controlled to transmit only, receive only, or to transmit and to receive simultaneously in a full duplex mode. There are two selectable modes of data transfer. Data may be exchanged between the terminal processor 27 (FIG. 1) and the controller chip 26 utilizing a programmed input/output (PIO) transfer mode or direct memory access (DMA) transfer mode. A DMA data exchange operation requires the processor 27 to relinquish control of the transfer operation to the controller chip 26 upon request. When given control, the controller chip 26 will transfer data from the terminal memory 28 to the Transmit Buffer 136 during a transmission operation and will transfer data from its Receive Buffer 160 to the terminal memory during a receive operation. A data transfer in the PIO mode is performed by appropriately reading the Receive Buffer 160 and writing to the Transmit Buffer 136. The terminal processor 27 is flagged by the generation of an interrupt signal notifying the PU of an impending write or read operation.

In the DMA mode, the controller chip 26 when requiring a data exchange will issue a request to the processor 27 which at the appropriate time in its own internal operation will transfer control of the transfer operation to the controller chip 26. When multiple DMA devices within each terminal are involved, the DMA Contention and Control circuit 122 (FIG. 2B) determines priority of access to an internal communication bus to the terminal processor unit 27. Upon gaining control of the internal communication bus (not shown) the DMA Contention and Control circuit 122 (FIG. 2B) initiates a DMA operation. The memory location addressed during a DMA write operation is determined by the Receive High and Low Address counter/registers 180 and 184 respectively (FIG. 2C). The memory location address during a DMA read operation is determined by the Transmit High and Low Address counters/registers 182 and 186, respectively. During transmission operations, a DMA read cycle is initiated for each data character to be transmitted. The Transmit High and Low Address concatenated data fields provide the memory address to be read and transferred to the Transmit Buffer 136 (FIG. 2C) during reception and a write DMA cycle is initiated for each data character received. The Receive High and Low Address concatenated data fields provide the memory address when the data from the Receive Buffer 160 (FIG. 2B) is to be transferred. Memory address signals appear on the $AD_0$–$AD_7$ and $A_8$–$A_{15}$ pads 72–86 and 92–106 respectively (FIGS. 2A–2D inclusive). Upon completion of a DMA transfer operation, the appropriate High and Low Order Address counters/registers are incremented. The Extended DMA counter 198 (FIG. 2C), the Transmit DMA counter 194 and the Receive DMA counter 196 are countdown counters which indicate the number of completed DMA transfers. Whenever the Transmit DMA counter 194 or the Receive DMA counter 196 pass through zero, the processor 27 is notified on an interrupt basis. The Extended DMA counter 198 adds four bits to the Transmit DMA counter and four bits to the Receive DMA counter to allow a maximum of 4,096 DMA transfers before a zero flag is generated which requires further processor 27 control.

The Status register 192 (FIG. 2A) is a read-only register. The status of the controller chip 26 is indicated by the signal level of the data bits stored in the Status register after an interrupt is activated. As shown in the following TABLE I, there are seven data bits stored in the Status register 192.

TABLE I

| $b_7$ | $b_6$ | $b_5$ | $b_4$ | $b_3$ | $b_2$ | $b_1$ | $b_0$ |
|---|---|---|---|---|---|---|---|
| EOF | RNS | TNS | FCS ERR | RX ABT | T/R | DMA TRM | SVC RQ |

The Service Request (SVCRQ) bit is used only during a PIO operation. This bit is set when either the Transmit Buffer register 136 (FIG. 2B) or the Receive Buffer 160 requires servicing. The Direct Memory Access Terminate (DMATRM) bit is used only during a DMA operation. The DMATRM bit is set when either the Transmit or Receive DMA counter/registers 196 and 194 (FIG. 2C) has counted down to zero from a preset value. The Transmit/Receiver Indicator (T/R) bit indicates the source which sets the DMATRM bit. When the bit is set to a 1, allowed DMA transfers have terminated on the transmit channel. If the bit is 0, allowed block space for DMA access has terminated on the receive channel.

During a PIO operation, the T/R bit indicates the source of an interrupt generated when the Status register bit SVCRQ is set. When the bit is one, the transmit channel requires a byte to be written to its Transmit Buffer register 136. When the bit is 0 during a PIO operation, the receive channel requires a byte to be read from its Receive Buffer register 160. The Receive Abort (RXABT) bit is used only in the receive mode. Immediately following the detection of an abort condition (seven contiguous 1's of a received data frame), the TXABT bit is set. The Frame Check Sequence Error (FCSERR) bit is used only in the receive mode. After receiving a complete frame of data, the received data frame FCS bytes (FIG. 7B) are compared to the FCS bytes generated by the controller chip 26. The FCSERR bit is set if this comparison does not match. The Transmitter Not Serviced (TNS) bit is set only in the transmit mode. This bit is set when a byte was not available in the Transmit Buffer register 136 (FIG. 2C) and is to be loaded into the Transmit Shift register 138 to maintain transmission continuity. This bit operates the same in either a PIO or a DMA transfer mode. The End Of Frame (EOF) bit is used only in the receive mode. The bit is set when a closing flag or an abort is detected. An interrupt is generated approximately eight bit times after this bit is set.

The Command register 188 (FIG. 2A) is a write-only register. All the controller chip 26 functions are controlled by the eight bits stored in the Command register. As previously disclosed, the controller chip 26 can operate in a full-duplex mode. The transmit and receive circuitry must retain the same mode of operation either DMA or PIO. The following TABLE II discloses the bits stored in the command register 188.

TABLE II

| $b_7$ | $b_6$ | $b_5$ | $b_4$ | $b_3$ | $b_2$ | $b_1$ | $b_0$ |
|---|---|---|---|---|---|---|---|
| TXFRM | TXFLG | RXA | RXB | PIO/ DMA | DIAG | SWRST | PT |

The Production Test (PT) bit is used only by the production test software when screening the chips in the production process. The Software Reset (SWRST) bit disables the Command register outputs and resets all Command register bits. When software sets the bit SWRST, an internal latch is set which enables the Command register bits to be executed. This internal latch is reset during a power-up condition by the Buss Reset bit BRST appearing on the bonding pad 114 and transmitted over line 200 (FIG. 2D), thus disabling the Command register outputs. The Diagnostic (DIAG) bit is provided for field testing of the controller chip 26. When the bit DIAG is set, a plurality of switching transistors 201, 203 and 205 (FIG. 2D) are actuated for disabling the transmission lines associated with the bonding pads 108–112 inclusive (FIG. 2D) and an internal loop is set up which routes transmitted Manchester encoded data to the Manchester receiver circuitry. Only the TDM, $\overline{\text{TDM}}$ and RDM pads are bypassed.

The Programmed Input/Output Direct Memory Access (PIO/DMA) bit when set causes bus transfers to be made in the PIO mode. The DMA bus transfers are made when the bit is reset. This bit defines the mode of operation for both the transmit and receive channel. The Receive A (RXA) and the Receive B (RXB) bits when set allow the receive channels to enter the receive mode. The Transmit Flag (TXFLG) bit when set enables the controller chip 26 to transmit the contiguous ones (01111110). The Transmit Frame (TXFRM) bit when set allows the controller chip 26 to begin the transmission of a frame of data and subsequently requests data bytes from the terminal memory 28 for transmission. During a DMA operation, the controller chip 26 resets this bit when transmission is complete or a Transmitter-Not-Serviced condition occurs. In the PIO mode, this bit is reset by software to terminate transmission or is reset by the controller chip 26 when a Transmitter-Not-Service condition occurs. During a PIO operation, the bits TXFRM and TXFLG are reset while the bit PIO/DMA is set in order to terminate transmission. When the bits TXFLG, TXFRM and PIO/DMA are reset while a transmission is occurring, an abort sequence is generated.

Figure 4:
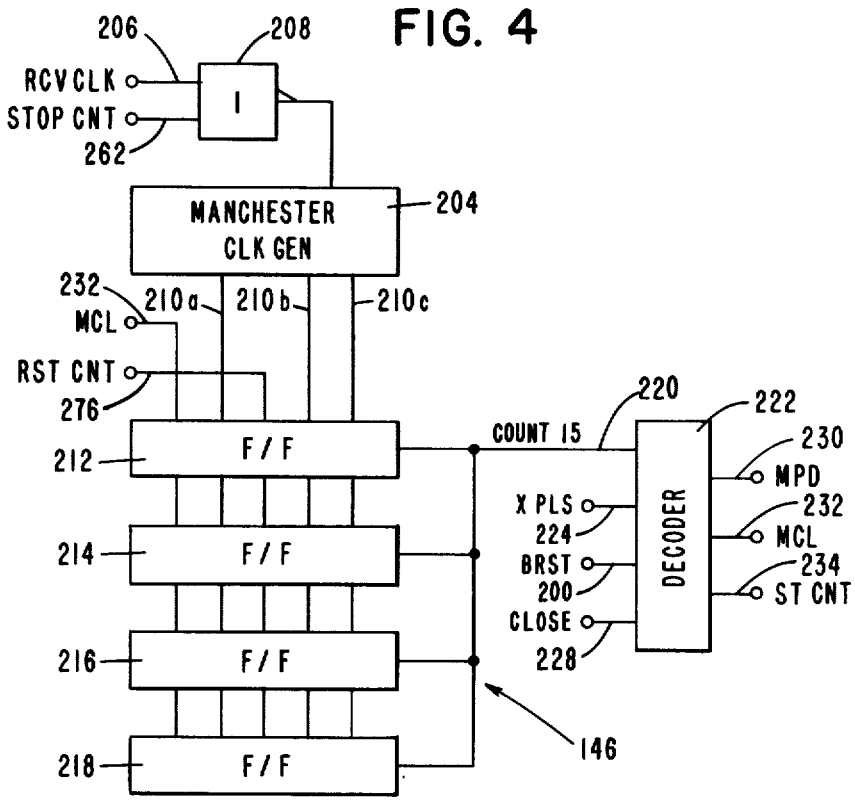
FIG. 4 is a block diagram of a portion of the logic circuit of the Manchester counter.
Figure 5:
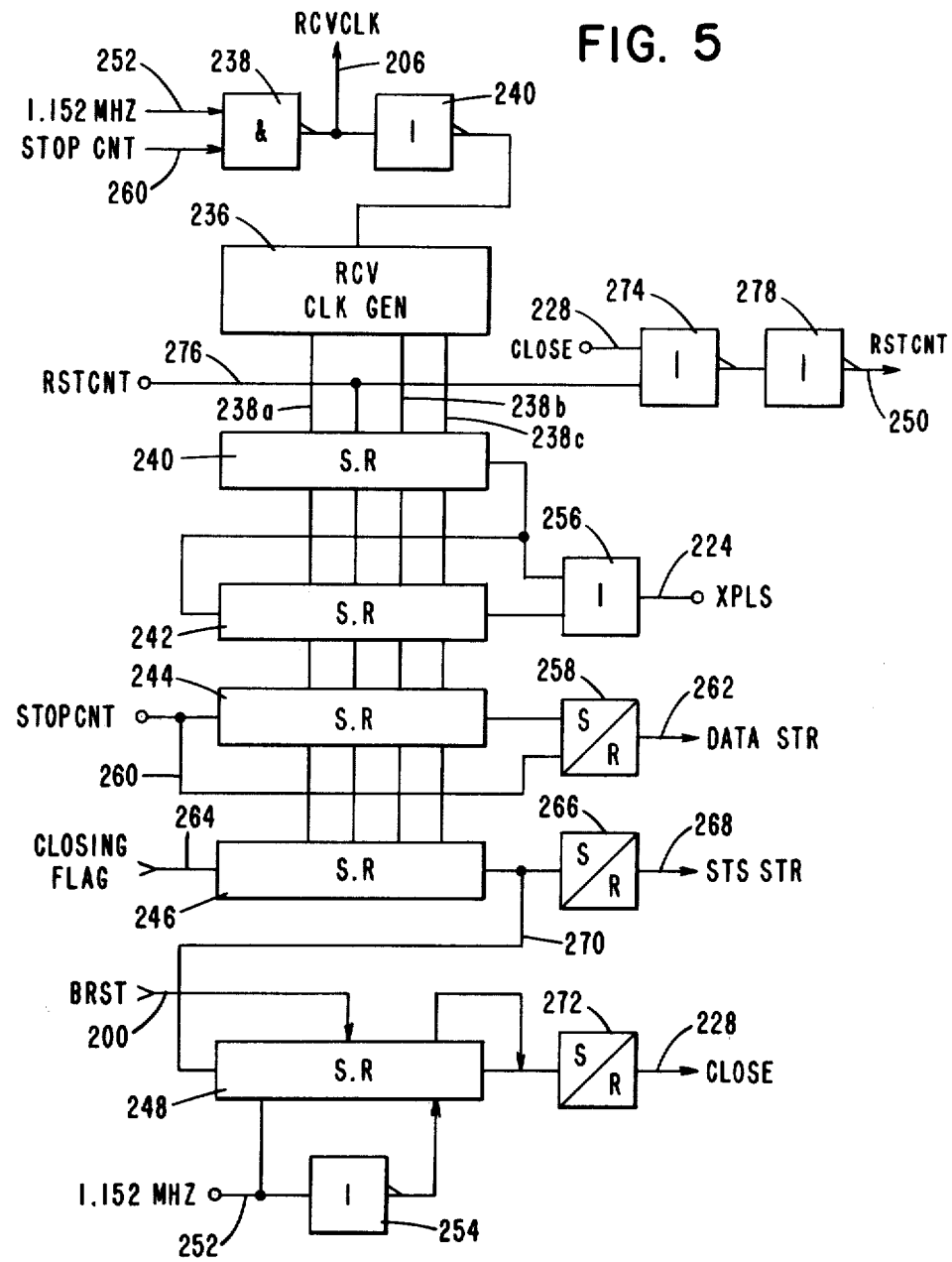
FIG. 5 is a block diagram of a portion of the logic circuit of the Manchester decoder located in the Receive Control Circuit.

Referring now to FIGS. 4 and 5, there is shown the logic circuits used for decoding the received Manchester encoded data appearing at the RDM bonding pad 112 (FIG. 2D) and transmitted over line 202. Included in the logic circuits is a three phase clock generator 204 (FIG. 4) which is clocked by the system 1.152 MHz. clock RCVCLK appearing on line 206 and inputted into the generator 204 through a NOR gate 208. As previously disclosed, each of the circuits in the controller chip 26 has its own clock generator. The clock generator 204 will output alternating signals over the output line 210a–210c inclusive to the Manchester Counter 146 (FIG. 2A) comprising a number of toggled flip-flops 212–218 inclusive which will output a high signal COUNT 15 over line 220 upon reaching the count of 15. The signal COUNT 15 is inputted into a decoder circuit 222 which, in addition to receiving the output count of the Manchester Counter 146, receives the signal XPLS (X pulse) over line 224, the signal BRST (bus reset) over line 200 and the signal CLOSE over line 228. The decoder circuit 222 located in the RX Control circuit 142 (FIG. 2A) will output the signal MPD (missing pulse detect) over line 230, the signal MCL (Manchester clear) over line 232 and the signal STCNT (stop counter) over line 234.

The Manchester decoder system further includes a three phase receive clock generator 236 (FIG. 5) located in the RX Control circuit 142 which is clocked by the 1.152 MHz. clock signals RCVCLK transmitted through a NAND gate 238 and outputted over line 206 through the inverter 240 to the clock generator 236. The clock generator 236 will output alternating signals over lines 238a–238c inclusive to a plurality of shift registers 240–248 inclusive. The shift registers 240–246 inclusive also receive the reset signal RSTCNT over line 250 from the Receiver Control circuit 142 (FIG. 2A) while the shift register 248 is reset by the bus reset signal BRST appearing on line 200. The shift register 248 is clocked by the system clock signals 1.152 MHz. transmitted from the Receiver Control circuit 142 (FIG. 2A) and appearing on line 252. The clock signals are inverted by the inverter 254.

The output of the shift registers 240 and 242 (FIG. 5) are inputted into an Exclusive OR circuit 256 which outputs the signal XPLS over line 224 to the decoder 222 (FIG. 4). The registers 240 and 242 together with the circuit 256 comprise the XPLS Detector 144 (FIG. 2A). The output of the shift register 244 is inputted into the set input of a set/reset latch 258 which is reset by the stop counter signal STOPCNT appearing on line 260 and generated by the Receiver Control circuit 142 (FIG. 2A) at the completion of receiving a frame of data bits. The latch 258 will output a data strobe signal DATASTB over line 232 each time the signal COUNT 15 is generated. This signal controls the Receiver Control circuit 142 in sampling the data bit stream received by the controller chip 26 over the RDM bonding pad 112 (FIG. 2D). At the end of the bit stream of the incoming frame of data (FIG. 7B), a flag is detected comprising the data bits 01111110 by the Receive Ones Counter 150 (FIG. 2A) which enables the Receive Control circuit 142 to raise the signal CLOSINGFLAG over line 264 (FIG. 5) which enables the shift register 246 to output a signal to the set input of a set/reset latch 266 resulting in the latch outputting over line 268 the status strobe signal STSSTR, which signal is transmitted to the Receiver Control circuit 142 resulting in the termination of a receive operation. The signal STSSTR is also transmitted over line 270 to the shift register 248 which enables a set/reset latch 272 to output the signal CLOSE over line 228, which signal enables a NOR gate 274 to output the counter reset signal RSTCNT received over line 276 through an inverter circuit 278 and over line 250 which resets the toggle flip-flops 212–218 inclusive (FIG. 4).

As is well-known in the art, data which is Manchester encoded is combined with a clock signal in which a positive-going voltage transition is generated to indicate a binary 1 bit and a negative-going voltage transition is generated to indicate a binary 0 bit. When consecutive 1 or 0 bits appear in the data frame, only a mid-bit transition is generated. Otherwise transitions occur at start and mid bit times. In decoding the Manchester encoded data, the Counter 146 (FIGS. 2A and 4) starts counting and is cleared each time the signal XPLS is generated over line 224 (FIGS. 4 and 5), which signal enables the decoder 226 to output the pulse MCL for resetting the Counter 146. When the Manchester Counter 146 reaches a count of 15, the signal COUNT 15 is generated indicating the detection of a missing transition, that is, the start bit position. The decoder 222 will output the missing pulse signal MPD over line 230 disabling the decoder 222 from raising the clear signal MCL over line 232. The decoder 222 will also output the signal STCNT over line 234 disabling the Manchester Counter 146. The Counter 146 is then in synchronization with the incoming data. It will initiate a counting operation upon the occurrence of the next XPLS and stop upon reaching a count of 15. Upon the generation of each COUNT 15 signal, the latch 258 (FIG. 5) will generate the strobe signal DATASTR enabling the Receiver Control circuit 142 to sample the incoming data stream for the received data at a point which is twenty five percent (25%) from the start of the bit time.

When a terminal 22 (FIG. 1) has data to be sent to another terminal through the RPU 20 or to the RPU 20, the controller chip 26 can execute the transmit operation in either a DMA or a PIO mode. In a DMA operation, the controller chip is required to be initialized which requires that the TXDMA counter/register 194 (FIG. 2C) be initialized to a value that is one less than the number of bytes of data to be transferred. The TXLADD register 186 and the TXHADD register 182 are initialized to the address of the first memory location from where the first transmitted byte of the data is to be read. Once the information has been inputted into the registers, a transmit command is issued by the Command register 188. If both the TXFRM and TXFLG bits are set in the Command register, the interframe time will be filled with contiguous flags (01111110) by the TXCONTROL circuit 124. If only the TXFRM bit is set, and the TXFLG bit is reset, then an idle sequence of sixteen 1's will follow the frame. After issuing the transmit command, the controller chip 26 initiates and executes all necessary DMA transfers and generates an interrupt to indicate when the last transfer has occurred. When the interrupt occurs, the Status register 192 is read by the terminal processor 27 in order to determine the cause of the interrupt. Since the controller chip 26 is capable of a full-duplex operation, four status conditions may occur. The status bit DMATRM (Table I) is a status condition which indicates the completion of a DMA block transfer. The status bit T/R indicates the source of the DMATRM status. If T/R is 1, the status bit DMATRM indicates completion of a transmit DMA operation. If the status bit T/R is 0, the status bit DMATRM indicates the maximum data frame length has been reached or exceeded. Status bits TNS and RNS indicate an error occurred during the DMA access operation, causing the transmitted data frame to be prematurely terminated or the received data frame to enter into an overrun condition.

In a PIO transmit operation, the command bit PIO/DMA in the Command register 188 is set to a binary 1. The chip 26 is initialized in the same manner as during a DMA operation. After issuing a transmit command, the chip will begin the transmit operation and will generate an interrupt to the terminal processor 27 (FIG. 1) notifying the processor of data which is to be read from the controller chip. The transmit channel is then enabled and certain timing requirements must be met to insure a complete transmission of the data frame. The Status register 192 (FIG. 2A) must be read by the processor 27 to determine the source of the interrupt since the transmit and receive channels may both be active. The status bits SVCRQ and T/R indicate the interrupt channel. If the status bit SVCRQ is set and T/R is set, the interrupt came from the transmit channel. Therefore, a data character must be transferred to the Transmit Buffer register 136 (FIG. 2C) before six communication bit times have elapsed since the occurrence of the interrupt. If the character is not transferred within the specific time, the status bit TNS will be raised. In order to terminate the transmission of a data frame which is in progress, a transmit terminate command comprising a sequence of binary ones and zero's must be raised to the chip within six communication bit times. If the terminate command is not raised before a specified time, an error condition results and any data transfers made up to that time will result in an erroneous data frame.

If the controller chip 26 is in a DMA mode at the time a transmission operation is to occur, the DMA Contention and Control circuit 122 (FIG. 2B) will resolve contention for control of a terminal processor 27 (FIG. 1) bus. If the processor 27 bus is available, the circuit 122 will generate the bus request signal $\overline{BRQ}$ over line 280. The chip 26 will then output over the address bonding pads 72-86 inclusive and 92-109 inclusive (FIGS. 2A-2D inclusive) 15 address bits stored in the Address registers/counters 182 and 184 (FIG. 2C). The low address and data bits are multiplexed over the address bonding pads 72-86 inclusive while the high address bits are outputted over the bonding pads 92-109 inclusive. The eight bit data character is read from the terminal memory 28 (FIG. 1) and stored in the Transmit buffer 136 (FIG. 2C). The data character is then transferred over the bus 282 to the Transmit Shift Register 138 which steers the character to the Transmit Multiplexer 130 (FIG. 2C). The Multiplexer 130 will control the formation of the data bit frame (FIGS. 6A and 6B). Initially, the Multiplexer 130 will output the training pattern field (FIG. 6A) of the data frame followed by the flag field and the data field. The bits of the data field are outputted using the clock signals generated by the Clock Generator 132 (FIG. 2C) and transmitted to the Multiplexer 130 through the Timing Chain circuit 134. The data bits are outputted over line 284 to the TDM bonding pad 112 (FIG. 2D) for transmission to the terminal processor 27.

When in an I/0 mode, the terminal processor 27 (FIG. 1) after reading the character from the terminal memory 28 is required to write a character in the terminal memory within a predetermined time period as disclosed previously. If the time period elapses without a processor operation, the controller chip 26 will put out an abort sequence of eight contiguous binary 1's which disables the transmission operation by resetting the transmit frame bit in the Command register 188 (FIG. 2A). When in a DMA mode, the DMA counter 194 (FIG. 2C) is set to a predetermined count when initialized. The counter 194 will count down during this operation. Upon reaching a count of 0, the Transmit Control circuit 124 will generate an interrupt signal to the processor notifying the processor that the processor is out of its allotted memory space and to read a character from the Transmit Buffer 136 (FIG. 2C). The Transmit Multiplexer 130 will add the FCS characters (FIG. 6) generated by the Generator 140 (FIG. 2B), the closing flag and the sixteen binary one bits comprising the idle sequence generated by the Transmit Ones Counter 126 before ending the transmission operation.

The receive channel connected to the RDM bonding pad 112 (FIG. 2D) is enabled when the proper command bit is written into the Command register 188 (FIG. 2A). The Command register bits are set only by software. The receive control circuits of the chip 26 receive the serial Manchester encoded data through the bonding pad 112 and decodes it for processing. The receive control circuits further perform flag recognition and accept a data frame upon a valid address comparison. Data bytes are decoded from the incoming bit stream and inserted 0's are removed. The data bytes are transferred from the controller chip 26 to the terminal processor 27 under control of the chip, the transfer mode being selected by the PIO/DMA command bit under software control. At the conclusion of receiving a data frame, an FCS comparison is made by the FCS Checker circuit 166 (FIG. 2B) and the frame status information is provided. If a controller chip accepts a frame of data but it does not contain the required minimum address and command bytes, the receive control circuits reject the data frame without flagging the processor and continues to search for the next incoming frame. The receive control circuits are enabled by software setting a one for both of the receive command bits RXA or RXB (Table II). The receive control circuits decode the command bits RXA and RXB to determine the type of address comparison that is to be made with the address bits of the incoming data frames; accept unique address or global, accept global, group or unique, or accept all addresses. The logic state of the command bits PIO/DMA determines the method of data transfer.

When the receive control circuits are enabled, the controller chip 26 enters into a receive idle state searching for an opening flag. Upon the Receive Control circuit 142 (FIG. 2A) detecting a flag or multiple contiguous flags, the controller chip examines the first non-flag bytes for address comparison by the Address Comparator circuit 152 (FIG. 2B) as defined by the command bits RXA and RXB. If the incoming address does not match the address of the terminal, the controller chip 26 ignores the frame and returns to a receive idle condition searching for another flag. When the address portion of an incoming frame matches the address of the host terminal, the frame is excepted. Once the address of the frame has been recognized, the frame must contain two more valid data bytes for the controller chip to begin a byte transfer to the terminal memory. Therefore, a data frame must contain an opening flag and three bytes that are not flags or abort bytes. If the frame does not meet this minimum requirement, the controller chip 26 ignores the frame and returns to a receive idle state. No interrupt is generated.

If the address bytes of the data frame match the address of the host terminal and the required minimum number of data bytes follow, the data bytes including the address bytes are sequentially placed in the Receive Buffer 160 (FIG. 2B) for transfer to the terminal memory 28. Each time a data byte is loaded into the Receive Buffer 160, the controller chip 26 requests the terminal memory to read the buffer by generating an interrupt signal $\overline{INT}$ when in a PIO transfer operation or generating a bus request signal $\overline{BRQ}$ when in a DMA transfer operation. If the terminal processor does not read the receive buffer within a specified time (approximately 125 us), a Receiver-Not-Service (RNS) condition exists and no further requests are made to the terminal memory during receipt of this data frame. The RNS does not reset until a character is read from the receiver buffer and a read status operation is completed.

The data bytes stored in the Receive Buffer 160 are transferred to the terminal memory 28 until a closing flag or an abort condition is detected. Upon receiving a closing flag, the two FCS bytes (FIG. 7B) preceding the closing flag are compared by the FCS Checker circuit 166 (FIG. 2B) to the FCS bytes generated from the bytes received by the channel and the end-of-frame (EOF) bit and any error bits that are set in the status register 192. If the status bit EOF is set, an interrupt signal is generated to the processor 27. The receive command bits stored in the Command register 188 are reset when the status bit EOF is detected. After the Command register has been read, all appropriate receive error bits are reset and the receiver is disabled.

When the receive operation is done in a DMA mode, the status bit DMATRM in the Command register 188 will be set along with the EOF bit, if the number of data bytes received equals the number of DMA transfers that software specified when the RXDMA counter/register 196 was initially set. If the status bits EOF, DMA, TRM and RNS are set, the number of data bits in the receive data frame was greater than the allowed number set by software to the transferred memory. This constitutes an error condition. When the status bit EOF is set indicating the end of a data frame, an interrupt signal is generated to the processor.

In order to receive a plurality of data frames, software must enable the controller chip 26 by command prior to each frame being received. Also at the conclusion of each data frame, the controller chip must acknowledge the receiver interrupt by reading the status register. The minimum time between frames received is determined by the speed at which the receiver logic circuits and the software can perform the above operation. For the receiver logic circuits of the controller chip 26 to have a valid operation, the closing flag of each of the data frames (FIG. 7B) should be followed minimally by one byte of any pattern before the flag bytes of the following frame are received.

The placement of the various circuits shown in FIGS. 2A-2D inclusive minimizes the length of the interconnective conductors, thereby reducing their associated capacitances and resistance. Numerous capacitance and resistance calculations and modifications of the topography of the circuitry were made to achieve optimum performance and data transmission between the terminal processor 27 and the controller chip 26. The placement of the receive control circuits (FIG. 2A) in the left side of the chip and the transmit control circuits (FIGS. 2B and 2C) in the right side of the chip provides a minimum capacitance for the longest interconnecting lines and a common bus for the signals associated with the circuits. For the same reason, the Address Comparator 152 (FIG. 2B) is located adjacent the counter/registers 162 and 164 and the DMA Contention and Control Unit 122 (FIG. 2B) is located between the Transmit Control circuit 124 (FIG. 2B) and the Receive Control circuit 142 (FIG. 2A).

Since the Address Counters 162, 164 (FIG. 2B), 182, 184 and 180 (FIGS. 2C and 2D) take up sixty percent (60%) of the chip area in height, such Counters were located near the bottom edge 34 adjacent the pads $AD_0$–$AD_8$ and $A_9$–$A_{15}$ inclusive whose signals they share. When signals originate adjacent the circuit for which they are intended, the circuits are incorporated within the larger circuit. An example of this is the pulse detect circuit 256 (FIG. 5) which is located within the Receive Control circuit 142.

Since each of the circuits in the chip 26 has its own clock generator, a system clock generator and its associated clock lines to each of the circuits is eliminated resulting in a substantial reduction of the chip area required together with the power required. The lack of extended clock lines reduces significantly the number of noise transients present in the circuits.

It should be recognized that a very high level of creativity is required of the architect in designing MOS LSI random logic circuits such as are used in microcomputers or microprocessor chips and the like because of the layout constraints for state-of-the-art manufacturing processes. For example, in silicon gate MOS manufacturing processes, the major constraints are the minimum widths and spacings of the diffused regions, the minimum widths and spacings for depletion mode gate implants, the minimum size required for pre-ohmic openings in the field oxide, the spacings required for the edge of pre-ohmic openings to the edge of diffused regions, the minimum widths and spacings of the polycrystalline silicon lines, the fact that such lines cannot cross over diffused regions and the minimum widths and spacings between the metal lines, and of course the constraint that conductors in the same layer, that is, polycrystalline silicon lines or metallization lines cannot cross each other. The high amount of capacitance associated with diffused regions and the resistance of both diffused lines and polycrystalline silicon lines and to a less extent of metal lines, provide further design constraints upon the chip architect. For logic circuits which may be characterized as random logic, such as those in the subject invention, a large number of lines between sections of logic circuitry are required and a very large number of possibilities for routing the various kinds of conductors to the various required sections of the chip taxes the ingenuity of even the most competent chip topology architect, and further taxes the capacity of the most sophisticated computer interconnection conductor routing programs yet available. It should be noted that those skilled in the art can prepare a mask set for manufacturing the integrated chip on the basis of the scale reproductions of the photomasks disclosed in FIGS. 8-14 inclusive.

Figure 15:
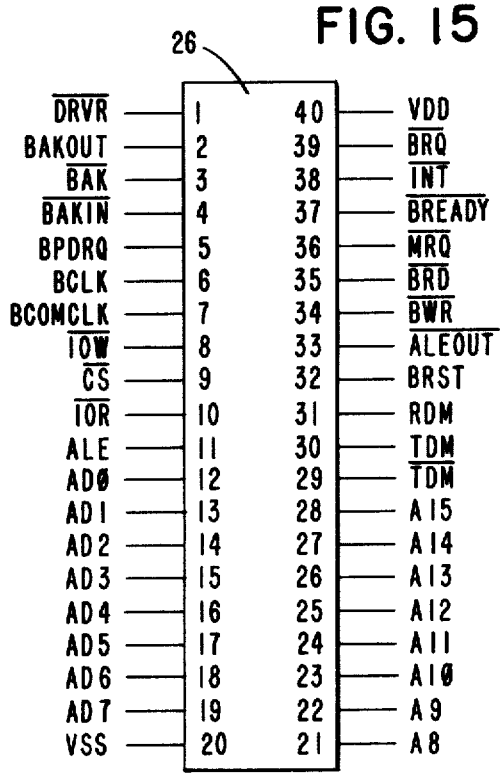
FIG. 15, on the sheet containing

A 40-pin dual-in-line semiconductor package suitable for housing the communication controller interface chip 26 described herein is illustrated in FIG. 15. The sequence of the pins is chosen to provide maximum utility in placing such a chip on a printed circuit board.

While the invention has been described with respect to a particular detailed layout of the communication controller chip, certain variations can be made by those skilled in the art without departing from the true spirit and scope of the invention as defined in the appended claims.

We claim:

1. An integrated circuit for controlling the transfer of a data message between a plurality of peripheral devices and an associated peripheral device each having a processor and a memory connected to said integrated circuit, said data message including encoded data signals, said integrated circuit comprising:

a transmission channel for transmitting data messages between said peripheral devices;

first storage means connected to said transmission channel for storing a data message transmitted over said transmission channel from another of said peripheral devices;

first means for controlling the storing of a data message in said storing means;

second storage means for storing a plurality of first control signals for controlling the operation of said controlling means;

said integrated circuit having first, second, third and fourth sequentially located edges;

said first storage means being located substantially closer to said third edge than to said first edge;

said first controlling means being located substantially closer to said fourth edge than to said second edge;

and said second storage means being located adjacent a corner formed by said third and fourth edges.

2. The integrated circuit of claim 1 in which said transmission channel comprises a plurality of first transmission lines for receiving a data message from one of said peripheral devices and a plurality of second transmission lines over which a data message is transmitted to one of said peripheral devices, said integrated circuit further including means for decoding the encoded data signals in the received data message, second means for controlling the transmission of a data message from the associated peripheral device to one of said peripheral devices, switching means connected to said first and second transmission lines, said switching means being located substantially closer to said second edge than to said fourth edge and said second storage means further storing a second control signal for enabling said switching means whereby a data message outputted by said second controlling means over said second transmission lines is transmitted over said first transmission line enabling said decoding means to decode said data message during a diagnostic operation.

3. The integrated circuit of claim 2 which further includes means connected to said second controlling means for determining priority of access of the integrated circuit to said second transmission lines enabling the integrated circuit to transmit a data message over said second transmission lines, means for storing the address of the peripheral device for which a data message is intended, means for generating a data check signal, first means for generating transmission clock signals, and multiplex means connected to said address storing means, data check signal generating means and transmission clock signal generating means for encoding the signals to be transmitted and for sequentially outputting over said second transmission lines a data message, said address storing means and said data check signal generating means being located substantially closer to said third edge than to said first edge.

4. The integrated circuit of claim 3 in which said first controlling means includes second transmission clock signal generating means for outputting a plurality of second clock signals, said integrated circuit further including counter means receiving said second clock signals for outputting a second control signal upon reaching a predetermined count, and said first controlling means further including second decoding means outputting a third control signal identifying the location of a data signal in the data message in response to receiving said second control signal, said third control signal enabling said first controlling means to store the data signals of said received data message in said first storage means, said counter means being located substantially closer to said fourth edge than to said second edge.

5. The integrated circuit of claim 4 which further includes a plurality of first and second bonding pads positioned adjacent said second, third and fourth edges, said first bonding pad connected to said first and second transmission lines and said second bonding pads connected to said first transmission lines, said integrated circuit further includes third decoding means connected to said first bonding pads for receiving data signals selecting either a transmit or receive operation, said third decoding means being generally located adjacent the corner between the third and fourth edges.

6. An integrated circuit for controlling the transfer of a data message between one of a plurality of peripheral devices and an associated peripheral device each having a processor and a memory connected to said integrated circuit, said data message including opening and closing control signals, address signals, encoded data signals and message validity signals, said integrated circuit comprising in combination:

a plurality of transmission lines for transmitting data messages between the peripheral devices and between the integrated circuit and its associated memory and processor;

first means connected to said transmission lines for receiving and storing a data message received over said transmission lines, said first storing means including a plurality of shift registers, each of which stores a portion of the data message including the address signals;

first means connected to said transmission lines and to said first receiving and storing means for controlling the operation of said first storing means and for decoding the data signals in the received data message;

means connected to said storing means for checking the message validity signals in the received data message;

second means for storing the address of the associated peripheral device;

comparing means connected to said first and second storing means for generating a first control signal in response to the occurrence of a coincidence between the address of the associated peripheral device and the address signals of the received data message;

first control storage means for storing a plurality of second control signals for controlling the operation of said decoding means, said checking means and said comparing means thereby enabling said integrated circuit means to receive and transfer the data signals to the memory of its associated peripheral device in response to the generation of said second control signals;

second controlling means connected to said transmission lines and said first control storage means, said first storage means storing third control signals for enabling said second controlling means to transmit a data message over said transmission channel to another of said peripheral devices;

said integrated circuit having first, second, third and fourth sequentially located edges;

said transmission lines engaging said second, third and fourth edges;

said first receiving and storing means being located substantially closer to said third edge than to said first edge and arranged along said third edge to reduce the length of said third edge;

said first controlling means being located substantially closer to said fourth edge than to said second edge;

said checking means being located substantially closer to said third edge than to said first edge;

said second address storing means being located substantially closer to said third edge than to said first edge;

said second controlling means being located substantially closer to said first edge than to said fourth edge;

said comparing means being located substantially closer to said fourth edge than to said second edge adjacent said first and second storing means to reduce the length of the interconnecting lines and thereby the capacitance and resistance of the circuit and said first storage means being located adjacent the corner formed by said third and fourth edges.

7. The integrated circuit of claim 6 in which said address storing means comprises a plurality of second storage members each storing one of a plurality of address signals identifying the associated peripheral device, said second storage members being arranged along the third edge of the integrated circuit to reduce the width of said third edge.

8. The integrated circuit of claim 7 which further includes a first bonding pad for receiving a data message from one of said peripheral devices and a plurality of second bonding pads over which a data message is transmitted to one of said peripheral devices, said transmission lines include a first transmission line connected to said first bonding pad and a plurality of second transmission lines connected to said second bonding pads, said integrated circuit further includes means for decoding the encoded data signals in the received data message, second means for controlling the transmission of a data message from the associated peripheral device to one of said peripheral devices, switching means connected to said first and second transmission lines, said switching means being located substantially closer to said second edge than to said fourth edge and said first storage means further storing a third control signal for enabling said switching means whereby a data message outputted by said second controlling means over said second transmission lines is transmitted over said first transmission lines enabling said decoding means to decode said data message during a diagnostic operation.

9. The integrated circuit of claim 8 which further includes means connected to said second controlling means for determining priority of access of the integrated circuit to said second transmission lines enabling the integrated circuit to transmit a data message over said second transmission lines, means for storing the address of the peripheral device for which a data message is intended, means for generating a data check signal, first means for generating transmission clock signals, and multiplex means connected to said address storing means, data check means and clock generating means for encoding the data signal to be transmitted and for sequentially outputting over said second transmission lines a data message, said address storing means and said data check signal generating means being located substantially closer to said third edge than to said first edge.

10. The integrated circuit of claim 9 in which said first controlling means includes second clock generating means for outputting a plurality of second clock signals, said integrated circuit further including counter means receiving said second clock signal for outputting a fourth control signal upon reaching a predetermined count, and said first controlling means further including second decoding means outputting a fifth control signal identifying the location of a data signal in the data message in response to receiving said fourth control signal, said fifth control signal enabling said first controlling means to store the data signals. of said received data message in said first receiving and storing means, said counter means being located substantially closer to said fourth edge than to said second edge.

11. The integrated circuit of claim 10 which further includes a plurality of third bonding pads located on said fourth edge for receiving data signals from said associated processor and third decoding means connected to said third bonding pads for receiving data signals from said associated processor selecting either a transmit or receive operation, said third decoding means being located adjacent the corner between the third and fourth edge and said first controlling means for reducing the capacitance in the interconnecting lines between the third decoding means and said first controlling means.

* * * * *